US011758432B2

United States Patent
Teyeb et al.

(10) Patent No.: US 11,758,432 B2
(45) Date of Patent: Sep. 12, 2023

(54) ENHANCED END TO END FLOW CONTROL FOR MULTI-HOP INTEGRATED ACCESS BACKHAUL (IAB) NETWORKS

(71) Applicant: Telefonaktiebolaget LM Ericsson (publ), Stockholm (SE)

(72) Inventors: Oumer Teyeb, Solna (SE); Gunnar Mildh, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 33 days.

(21) Appl. No.: 17/266,660

(22) PCT Filed: Aug. 9, 2019

(86) PCT No.: PCT/IB2019/056809
§ 371 (c)(1),
(2) Date: Feb. 8, 2021

(87) PCT Pub. No.: WO2020/031154
PCT Pub. Date: Feb. 13, 2020

(65) Prior Publication Data
US 2021/0314809 A1 Oct. 7, 2021

Related U.S. Application Data

(60) Provisional application No. 62/716,681, filed on Aug. 9, 2018.

(51) Int. Cl.
*H04W 28/02* (2009.01)
*H04W 76/12* (2018.01)
(Continued)

(52) U.S. Cl.
CPC ... *H04W 28/0284* (2013.01); *H04W 28/0278* (2013.01); *H04W 28/12* (2013.01); *H04W 76/12* (2018.02); *H04W 88/14* (2013.01)

(58) Field of Classification Search
CPC ......... H04W 28/0284; H04W 28/0278; H04W 28/12; H04W 28/0268; H04W 28/0263;
(Continued)

(56) References Cited

U.S. PATENT DOCUMENTS

2010/0302946 A1* 12/2010 Yang ................. H04W 28/0231
370/235
2010/0315948 A1* 12/2010 Yi ..................... H04W 28/0284
370/235
(Continued)

FOREIGN PATENT DOCUMENTS

CA  WO2017075692  * 11/2017

OTHER PUBLICATIONS

International Search Report and Written Opinion of the International Searching Authority, PCT/IB2019/056809, dated Nov. 28, 2019, 13 pages.
(Continued)

*Primary Examiner* — Sudesh M Patidar
(74) *Attorney, Agent, or Firm* — SAGE PATENT GROUP

(57) ABSTRACT

A method by an integrated access backhaul (IAB) node in a radio network includes generating a delivery status that indicates a status of a data connection, the data connection has a logical interface connection to a central unit (CU) node, the logical interface connection of the data connection is not terminated at the IAB node, and transmitting the delivery status to the CU node. The data connection may be a radio bearer.

15 Claims, 15 Drawing Sheets

Example Reporting Method

(51) Int. Cl.
H04W 28/12 (2009.01)
H04W 88/14 (2009.01)

(58) Field of Classification Search
CPC . H04W 28/10; H04W 28/0252; H04W 28/02; H04W 28/0273; H04W 28/0289; H04W 28/0247; H04W 76/12; H04W 76/11; H04W 76/27; H04W 76/18; H04W 88/14; H04W 88/085; H04W 72/08; H04W 80/02; H04W 84/047
See application file for complete search history.

(56) References Cited

U.S. PATENT DOCUMENTS

| | | | | |
|---|---|---|---|---|
| 2012/0207079 | A1* | 8/2012 | Wang | H04W 28/0284 370/315 |
| 2016/0142518 | A1* | 5/2016 | Raina | H04W 28/0289 370/230 |
| 2017/0245292 | A1* | 8/2017 | Agiwal | H04W 28/02 |
| 2018/0270700 | A1* | 9/2018 | Babaei | H04W 28/0278 |
| 2018/0324663 | A1* | 11/2018 | Park | H04W 36/22 |
| 2019/0104428 | A1* | 4/2019 | Kim | H04W 24/10 |
| 2019/0297555 | A1* | 9/2019 | Hampel | H04L 47/58 |
| 2020/0128420 | A1* | 4/2020 | Ryu | H04W 24/10 |
| 2020/0128465 | A1* | 4/2020 | Ahluwalia | H04W 72/0486 |
| 2020/0260327 | A1* | 8/2020 | Idan | H04W 88/08 |
| 2020/0359356 | A1* | 11/2020 | Sirotkin | H04W 28/10 |
| 2021/0219183 | A1* | 7/2021 | Huang | H04W 28/0236 |

OTHER PUBLICATIONS

"Adaptation Layer Design," 3GPP TSG-RAN WG2 Ad Hoc, Montreal, Canada, Jul. 2-6, 2018, (R2-1810675) Agenda Item 11.1.2, Huawei, HiSilicon (XP051526438) 5 pages.

"Lossless Data Transfer For IAB Design with Hop-by-Hop RLC ARQ," 3GPP TSG-RAN WG2 AH-1807, Montreal, Canada, Jul. 2-6, 2018, (R2-1810382) Agenda Item 11.1.2, AT&T, KDDI (XP051467553) 5 pages.

"The Consequences of Not Using Full F1-U Stack in IAB UP," 3GPP TSG-RAN WG2 AH-1807, Montreal, Canada, Jul. 2-6, 2018, (R3-184046) Agenda Item 24.1.2.1, Ericsson, KDDI, AT&T (XP051468327) 4 pages.

"Consideration on IAB Scenarios and Use Cases," 3GPP TSG-RAN WG2 Ad Hoc, Vancouver, Canada, Jan. 22-26, 2017, (R2-1801603) Agenda Item 11.1, Huawei-HiSilicon (XP051387038) 4 pages.

* cited by examiner

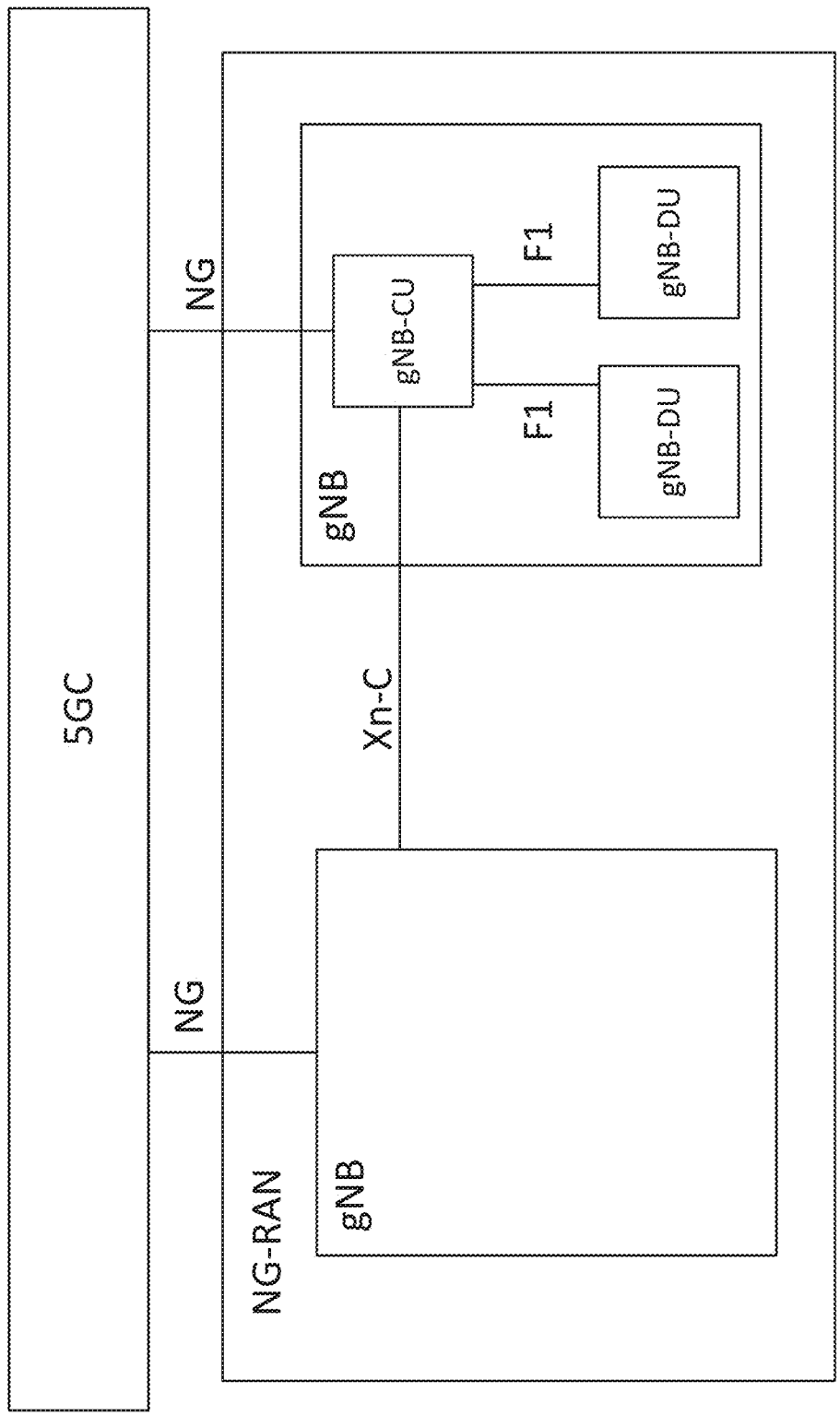
Figure 1. Exemplary 5G logical network architecture including CU-DU separation

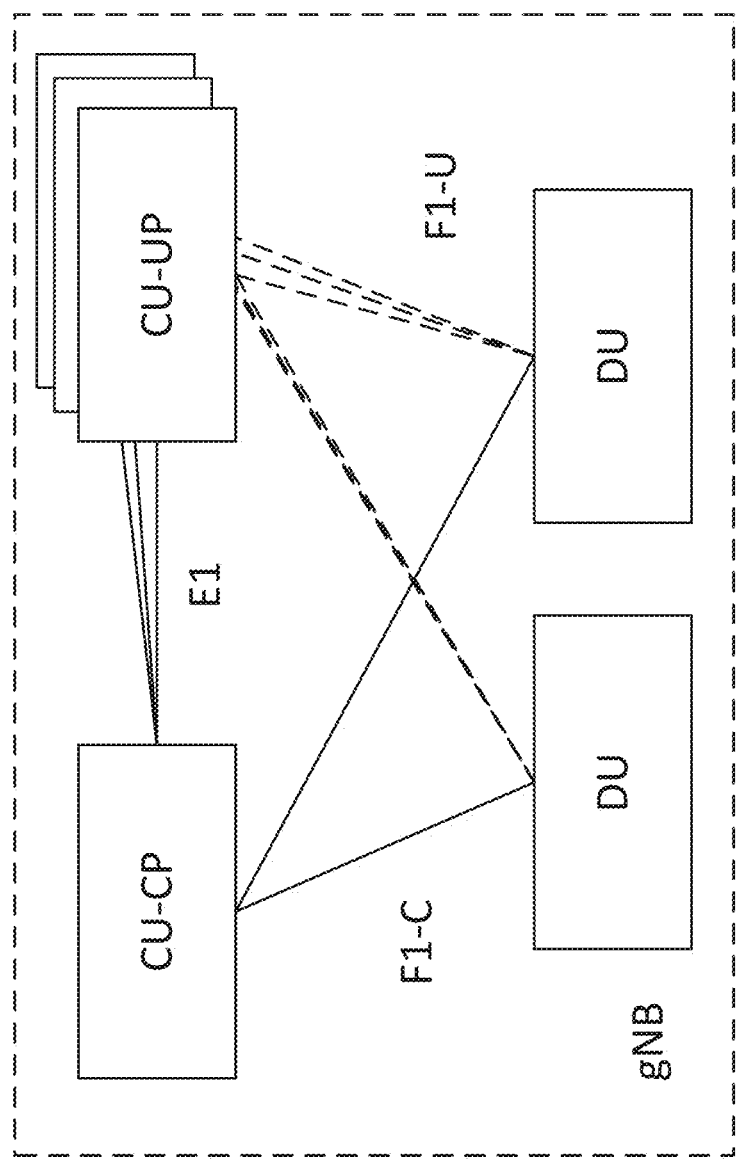
Figure 2: CU-CP/CU-UP separation

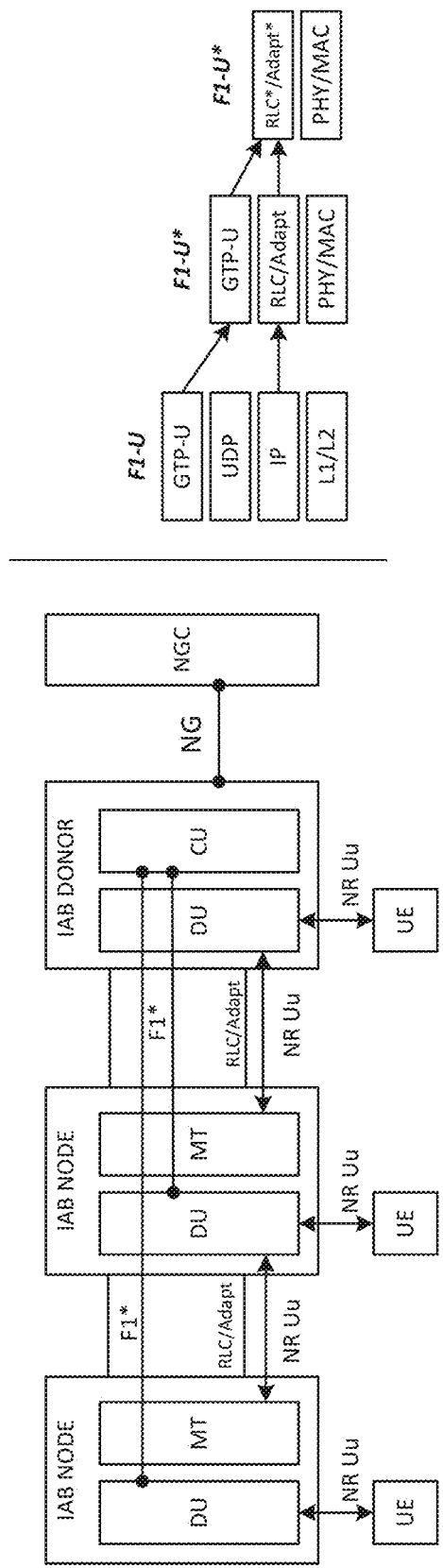
Figure 3: Reference diagram for architecture 1a

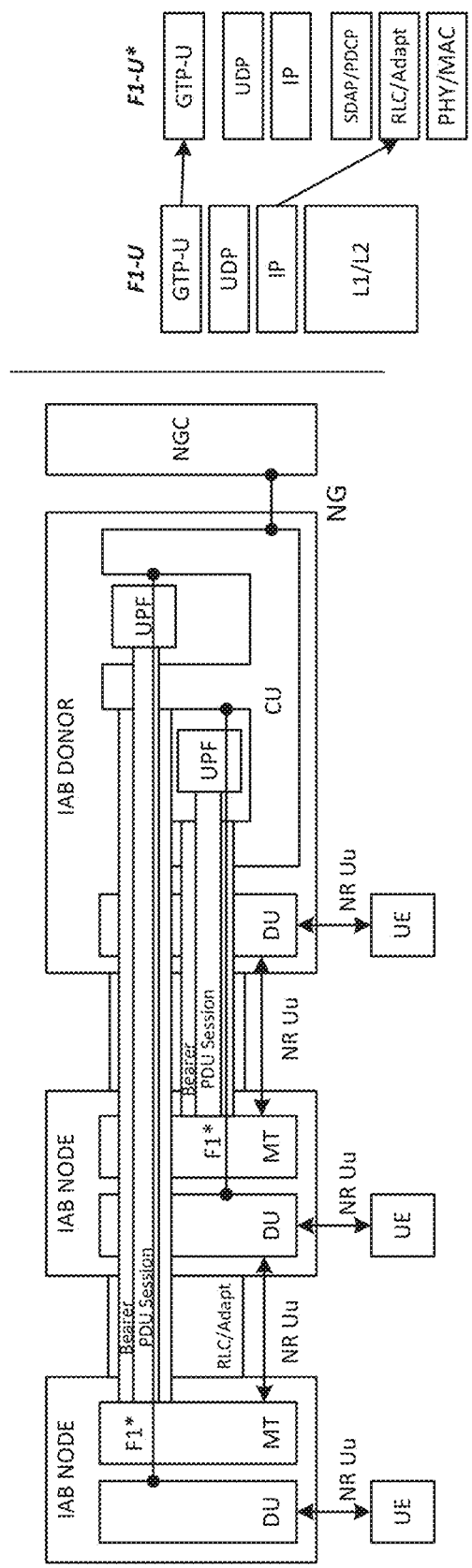
Figure 4: Reference diagram for architecture 1b

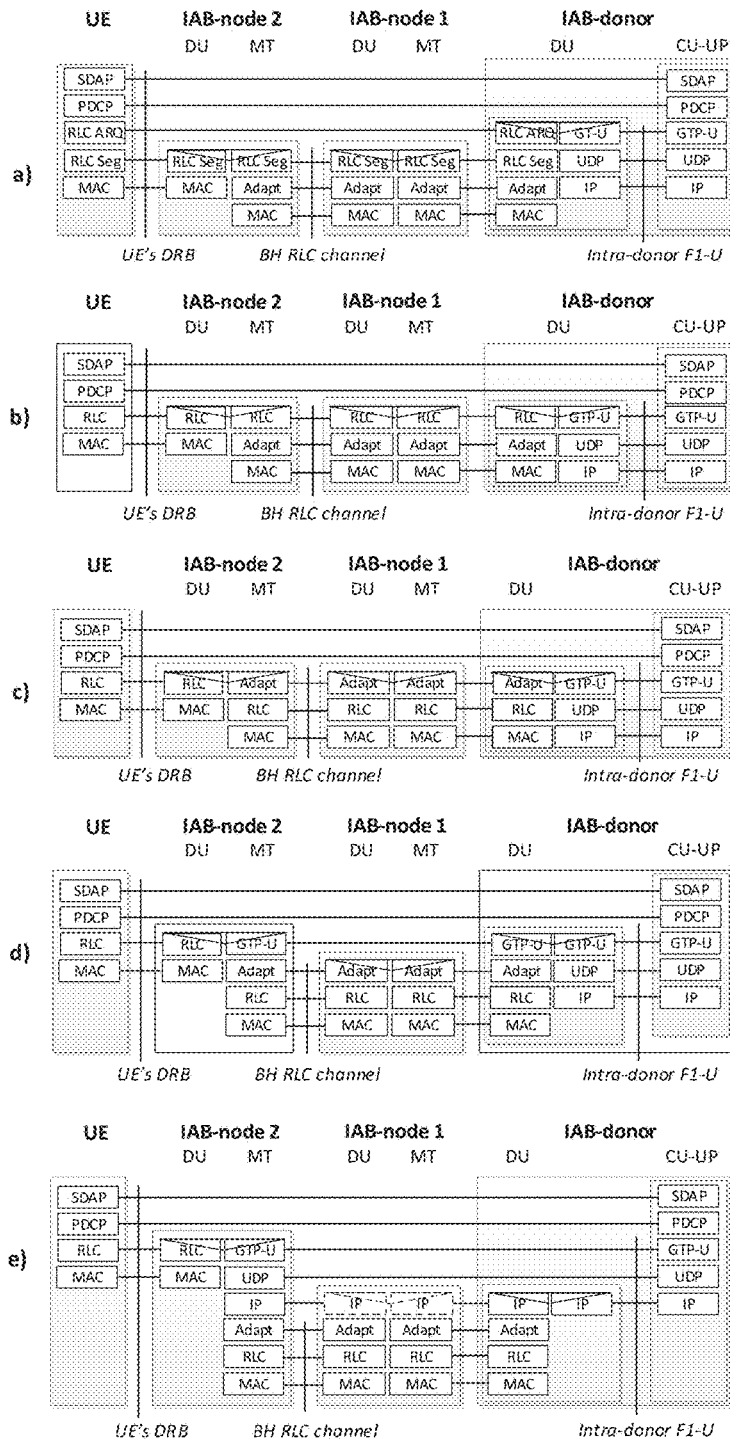
Figure 5: Protocol stack examples for UE-access using L2-relaying with adaptation layer for architecture 1a

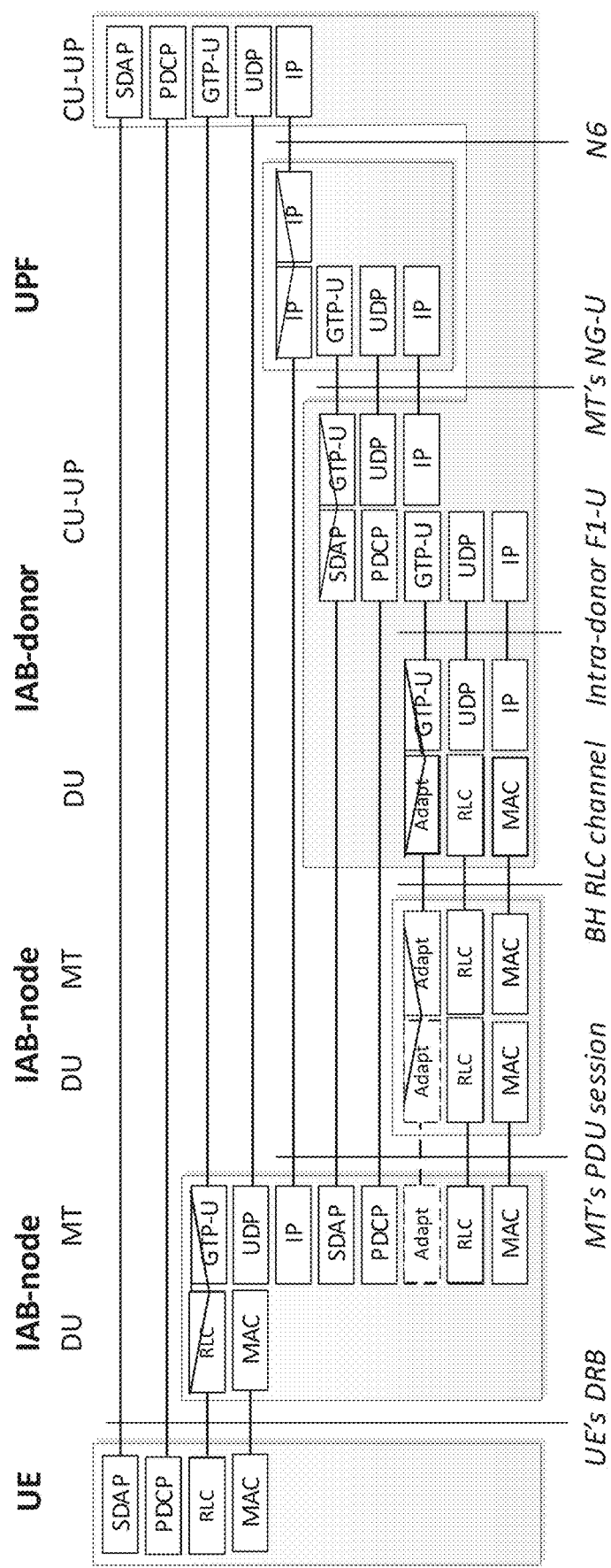
Figure 6: Protocol stack example for UE-access using L2-relaying with adaptation layer for architecture 1b

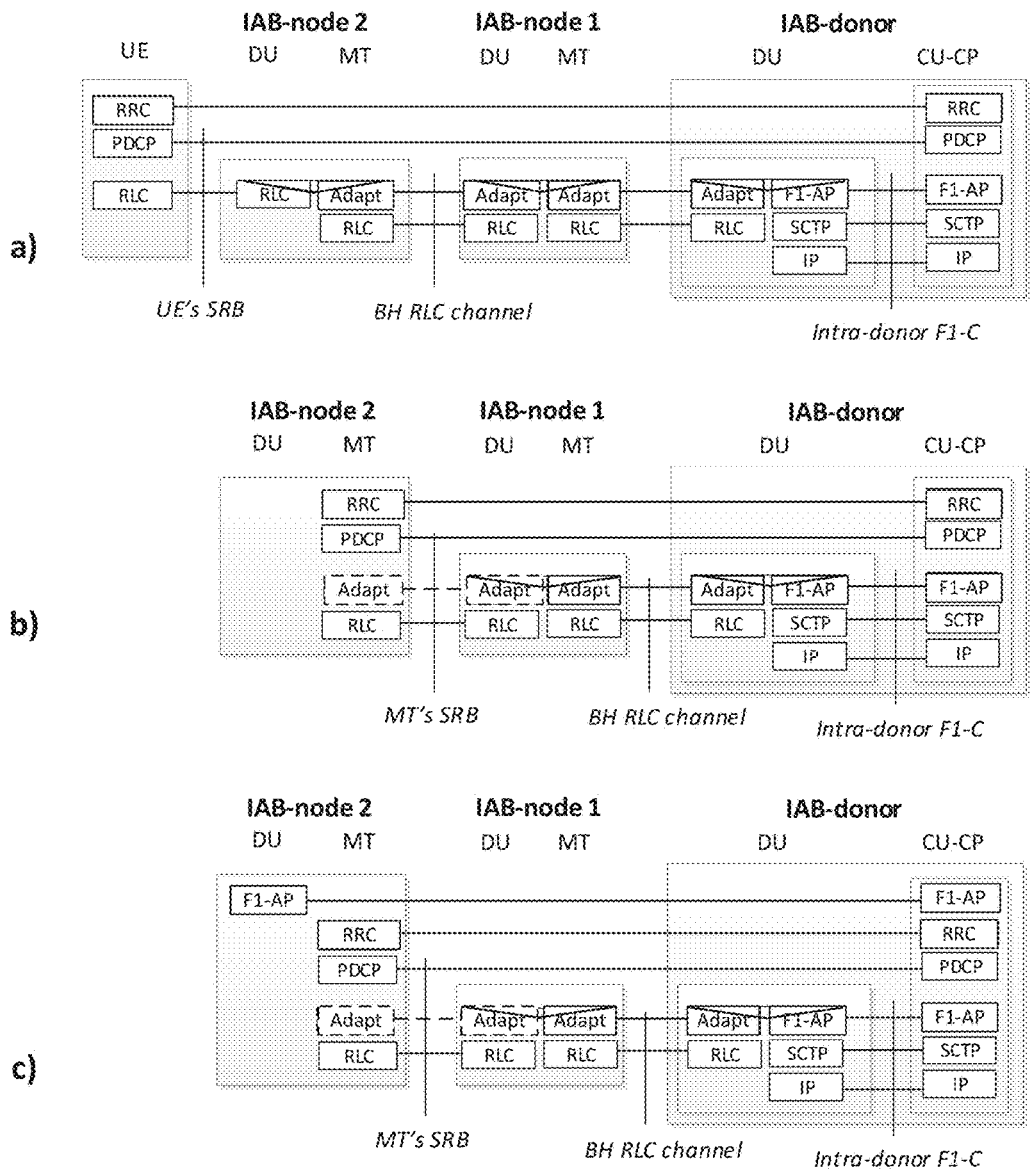
Figure 7A: Example for alternative 1 of architecture 1a. 1a: UE's RRC, 1b: MT's RRC, 1c: DU's F1-AP

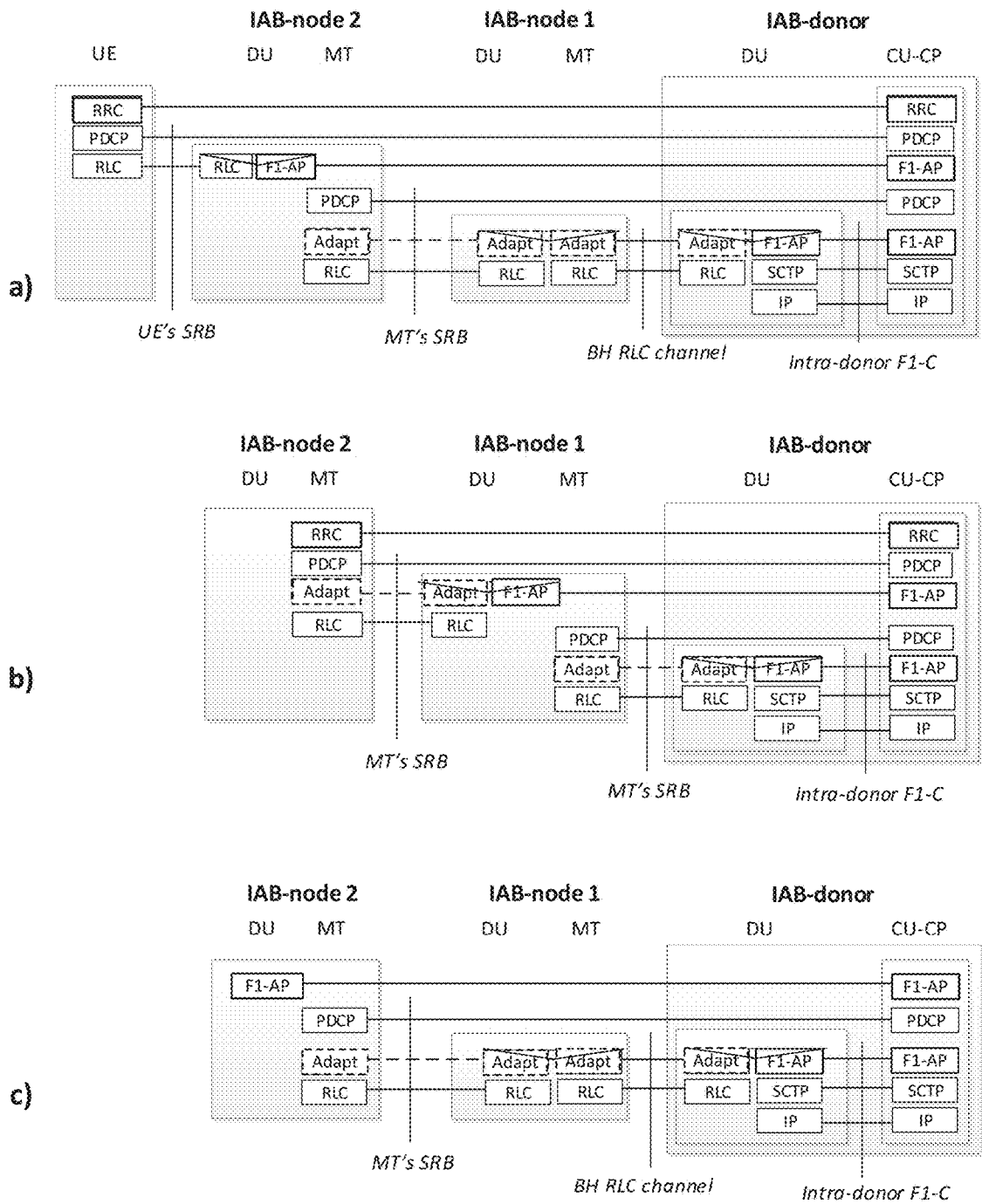
Figure 7B: Example for alternative 2 of architecture 1a. 2a: UE's RRC, 2b: MT's RRC, 2c: DU's F1-AP

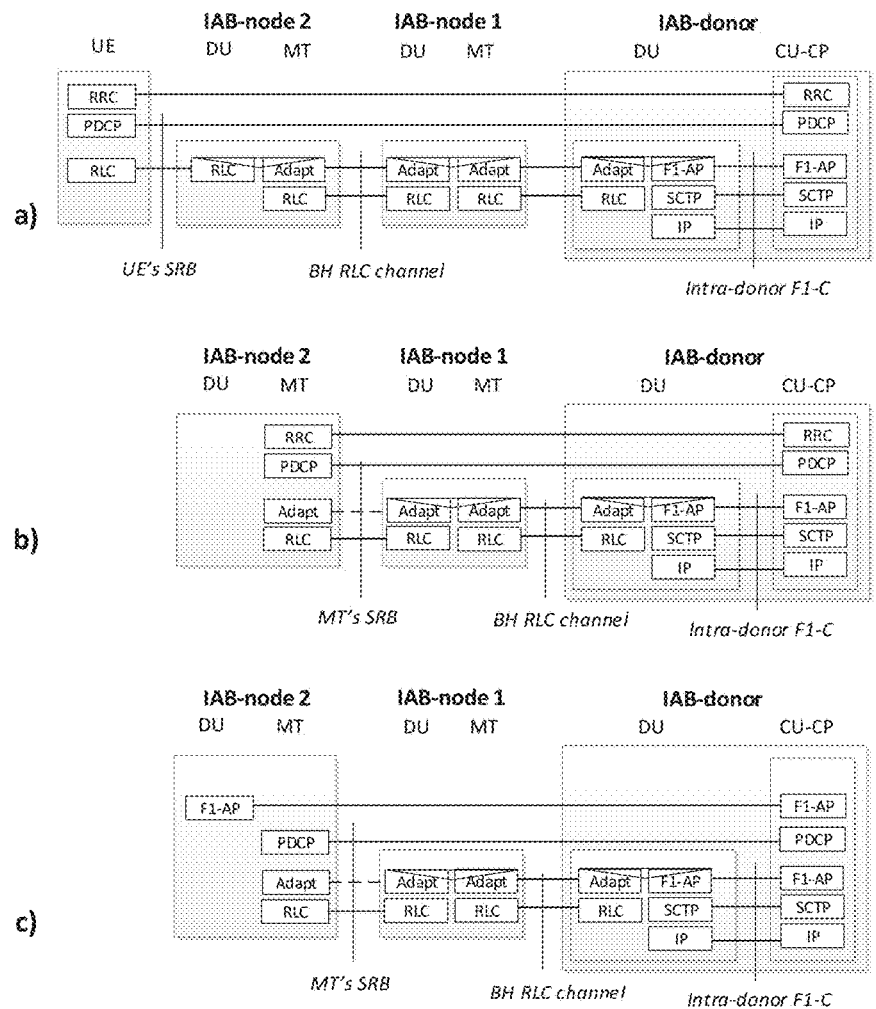
Figure 7C: Example for alternative 3 of architecture 1a. 3a: UE's RRC, 3b: MT's RRC, 3c: DU's F1-AP

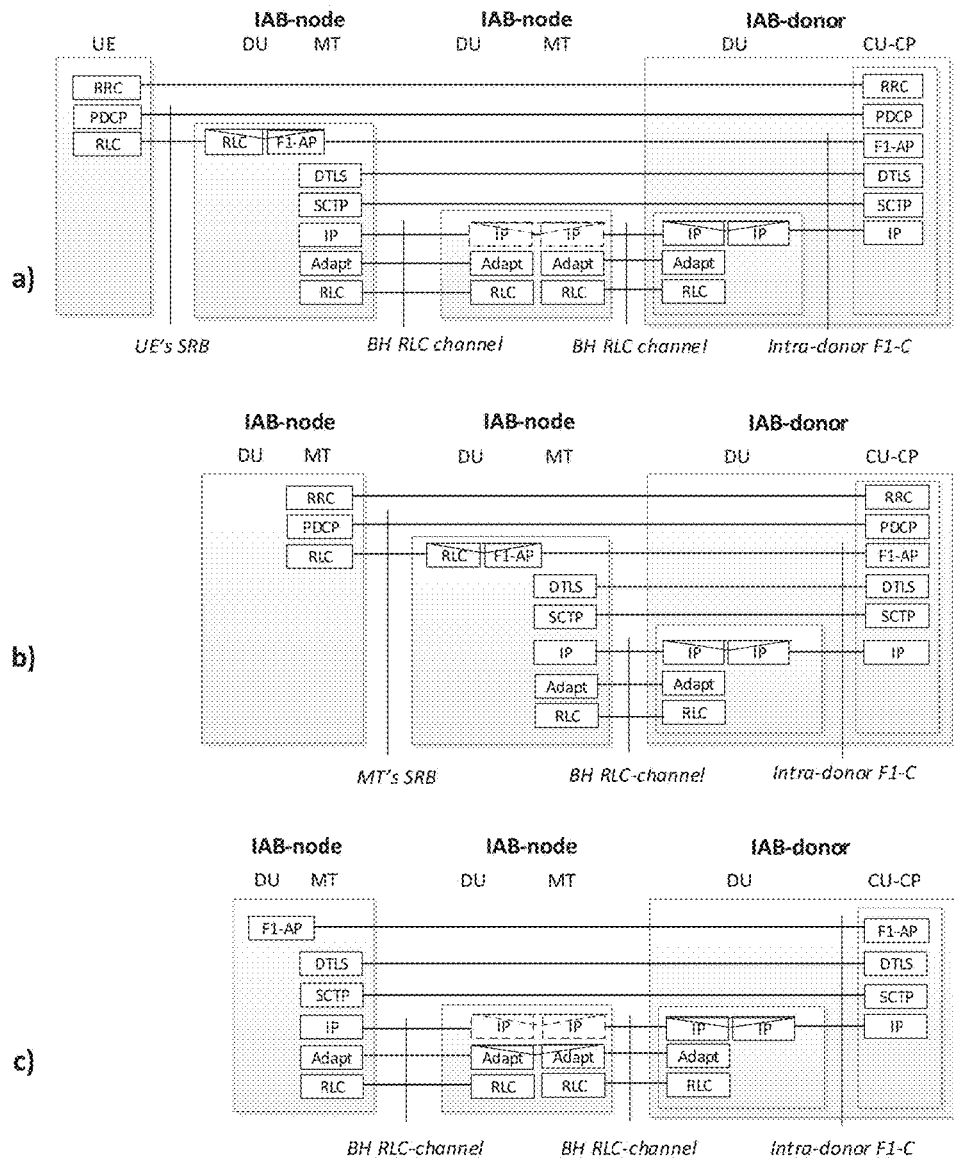
Figure 7D: Example for alternative 4 of architecture 1a. 1a: UE's RRC, 1b: MT's RRC, 1c: DU's F1-AP

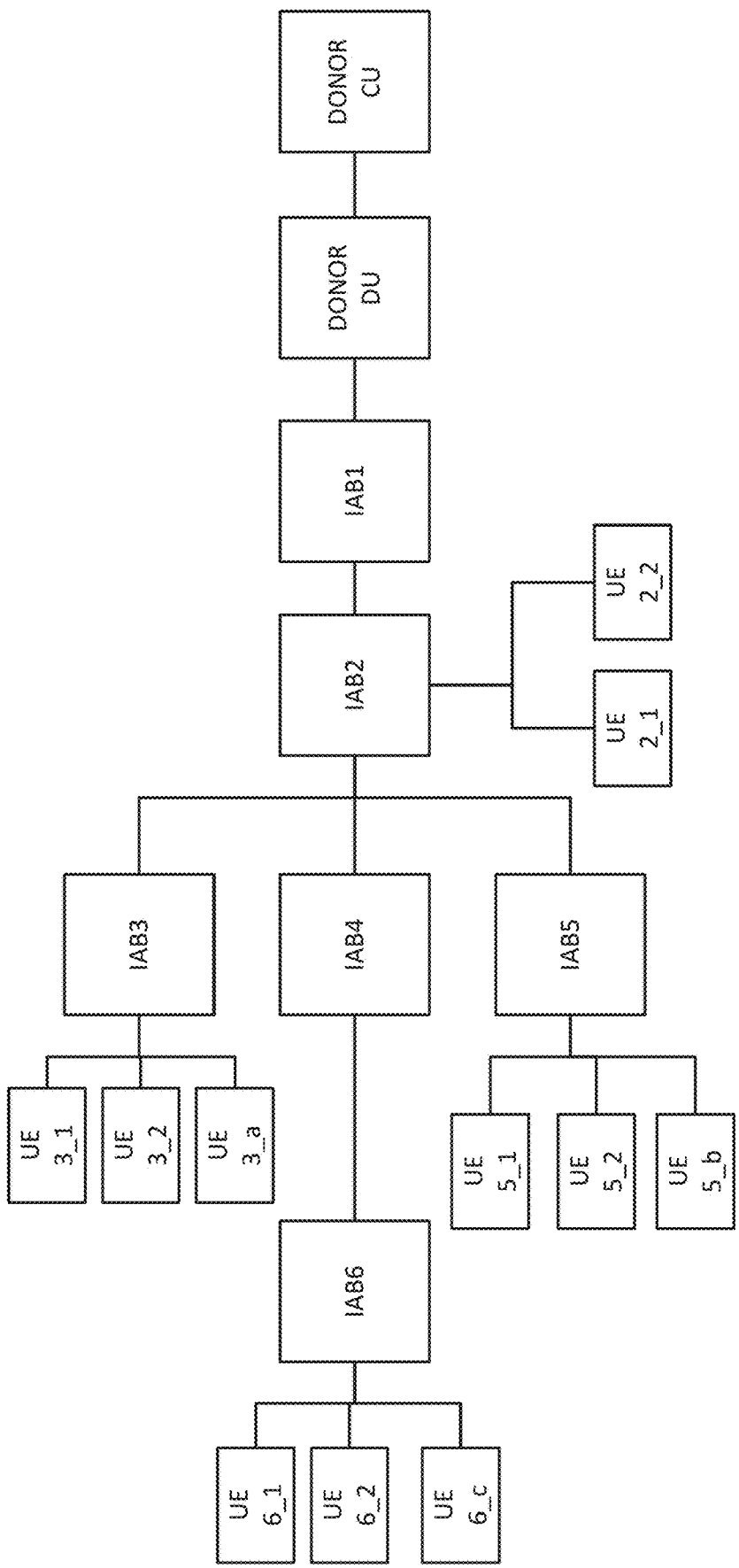
Figure 8: Example multi-hop scenario for end to end flow control

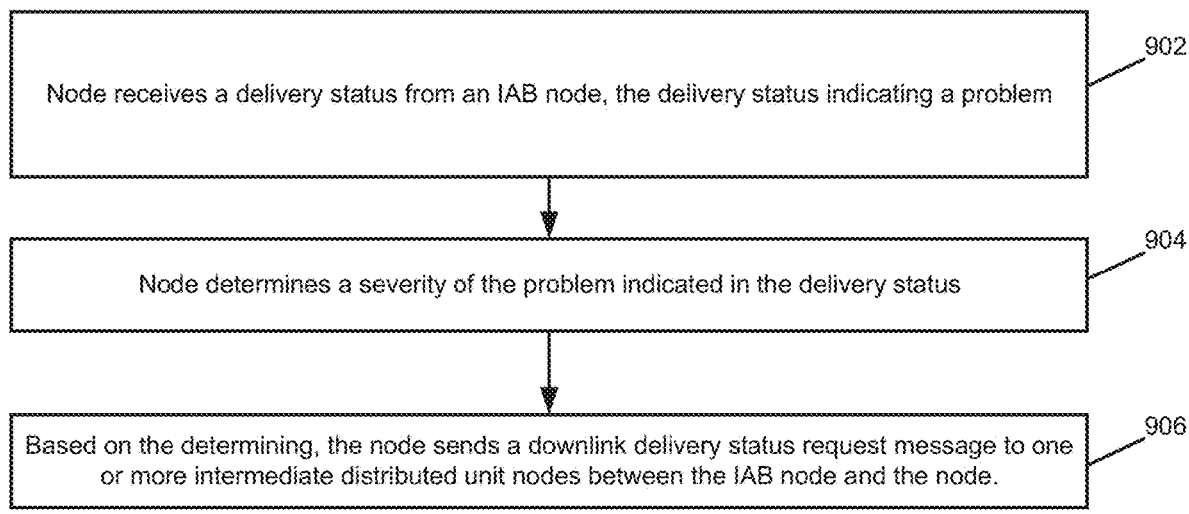
Figure 9: Example Traffic Flow Control Method

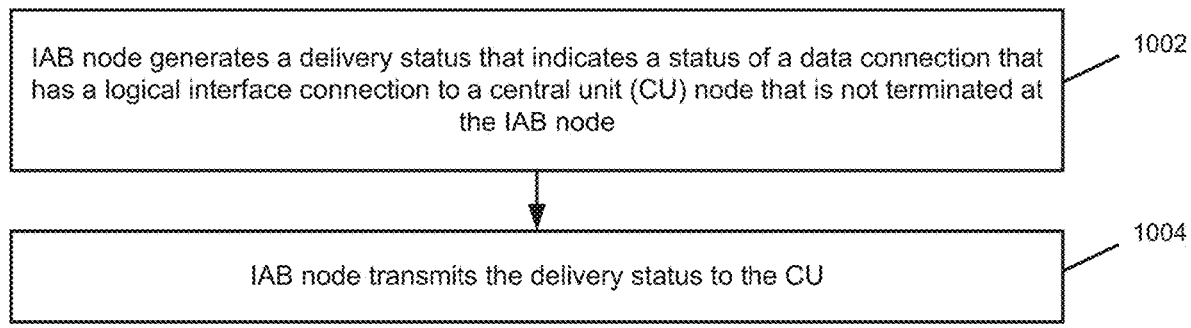
Figure 10: Example Reporting Method

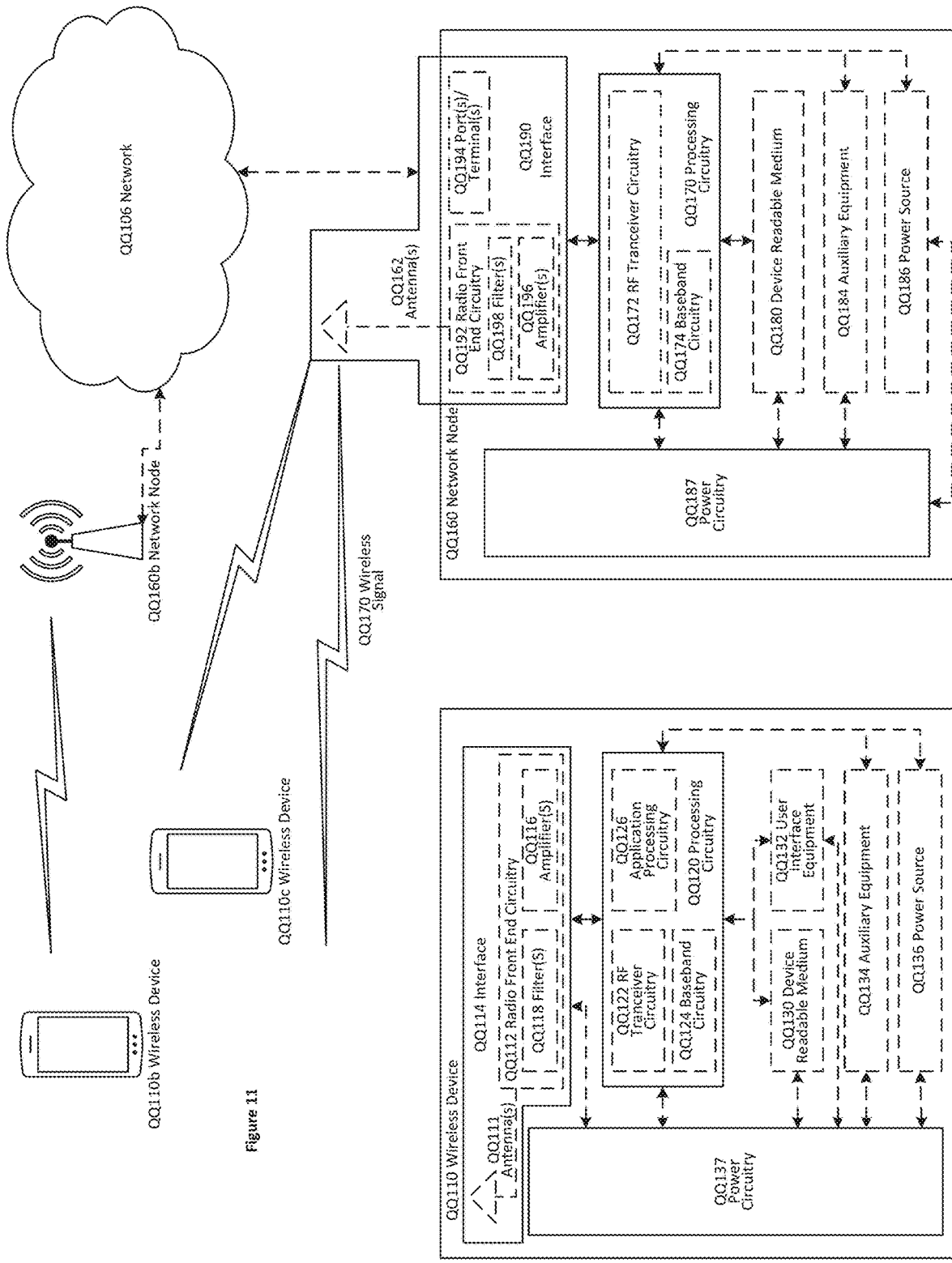

ENHANCED END TO END FLOW CONTROL FOR MULTI-HOP INTEGRATED ACCESS BACKHAUL (IAB) NETWORKS

CROSS-REFERENCE TO RELATED APPLICATION

The present application claims the benefit of and priority to U.S. Provisional Patent Application No. 62/716,681, filed Aug. 9, 2018, entitled "Enhanced End To End Flow Control For Multi-Hop Integrated Access Backhaul (IAB) Networks," the disclosure of which is hereby incorporated herein by reference in its entirety.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods and/or procedures disclosed herein do not have to be performed in the exact order disclosed, unless a step is explicitly described as following or preceding another step and/or where it is implicit that a step must follow or precede another step. Any feature of any of the embodiments disclosed herein can be applied to any other embodiment, wherever appropriate. Likewise, any advantage of any of the embodiments can apply to any other embodiments, and vice versa. Other objectives, features and advantages of the enclosed embodiments will be apparent from the following description.

The below descriptions provide a background on topics including (1) gNB-CU/DU split in NR and NG-RAN. This is relevant to the present disclosures in that the CU/DU split is reused for IAB nodes (Relays) in that the IAB node terminate DU functionality and connects to CU which is located in the "fixed" part of the network e.g. on the opposite side of the wireless backhaul interface; (2) Overview of the status of Integrated Access and Backhaul (IAB) in 3GPP; and (3) Overview of different architectures in IAB.

A. gNB-CU/DU Split in NR and NG-RAN

FIG. 1 illustrates a high-level view of the 5G network architecture, consisting of a Next Generation Radio Access Network (NG-RAN) and a 5G Core (5GC). The NG-RAN can comprise a set of gNodeB's (gNBs) connected to the 5GC via one or more NG interfaces, whereas the gNBs can be connected to each other via one or more Xn interfaces. Each of the gNBs can support frequency division duplexing (FDD), time division duplexing (TDD), or a combination thereof. The radio technology for the NG-RAN is often referred to as "New Radio" (NR).

The NG RAN logical nodes shown in FIG. 1 (and described in TS 38.401 and TR 38.801) include a Central Unit (CU or gNB-CU) and one or more Distributed Units (DU or gNB-DU). The CU is a logical node that is a centralized unit that hosts high layer protocols and includes a number of gNB functions, including controlling the operation of DUs. A DU is a decentralized logical node that hosts lower layer protocols and can include, depending on the functional split option, various subsets of the gNB functions. (As used herein, the terms "central unit" and "centralized unit" are used interchangeably, and the terms "distributed unit" and "decentralized unit" are used interchangeability.)

The gNB-CU connects to gNB-DUs over respective F1 logical interfaces. The gNB-CU and connected gNB-DUs are only visible to other gNBs and the 5GC as a gNB, e.g., the F1 interface is not visible beyond gNB-CU.

In NR and for Next Generation RAN it has been agreed to support a separation for the gNB into a Central Unit (CU) and Distributed Unit (DU). The DU terminates the radio interface towards the UE including the RLC, MAC and Physical layer protocols, while the CU terminates the PDCP and RRC protocols towards the UE as well as the NG-C/U interfaces towards 5G Core network (5GC) and Xn/X2 interface towards other NR gNBs and LTE eNBs. The CU/DU separation is described further in 3GPP TS 38.401 (see also figure below). Between the CU and DU an F1 interface is defined. The F1 application part protocol (F1-AP) which is defined in 3GPP 38.473.

Additionally it has been agreed in 3GPP RAN3 WG to support a separation of the gNB-CU into a CU-CP function (incl. RRC and PDCP for signaling radio bearers) and CU-UP function (incl. PDCP for user plane). The CU-CP and CU-UP parts communicate with each other using the E1 interface and the E1-AP protocol. The CU-CP/UP separation is illustrated in FIG. 2.

B. Overview of the Status of Integrated Access and Backhaul (IAB)

Densification via the deployment of more and more base stations (be them macro or micro base stations) is one of the mechanisms that can be employed to satisfy the ever increasing demand for more and more bandwidth/capacity in mobile networks (mainly driven by the high adoption of video streaming services). Due to the availability of more spectrum in the millimeter wave (mmw) band, deploying small cells that operate in this band is an attractive deployment option for these purposes. However, deploying fiber to the small cells, which is the usual way in which small cells are deployed, can end up being very expensive and impractical. Thus, employing a wireless link for connecting the small cells to the operator's network is a cheaper and practical alternative. One such solution is an integrated access backhaul (IAB) network where the operator can utilize part of the radio resources for the backhaul link.

Integrated access and backhaul has been studied earlier in 3GPP in the scope of LTE Rel-10. In that work, an architecture was adopted where a Relay Node (RN) has the functionality of an LTE eNB and UE modem. The RN is connected to a donor eNB which has a S1/X2 proxy functionality hiding the RN from the rest of the network. That architecture enabled the Donor eNB to also be aware of the UEs behind the RN and hide any UE mobility between Donor eNB and Relay Node(2) on the same Donor eNB from the CN.

During the Rel-10 also other architectures were considered e.g. where the RNs are more transparent to the Donor gNB and allocated a separate stand-alone P/S-GW node.

For NR similar architecture option can also be considered. One potential difference compared to LTE (besides lower layer differences) is that a gNB-CU/DU (Centralized Unit/Distributed Unit) split is defined for NR which allows a separation of time critical RLC/MAC/PHY protocols from less time critical RRC/PDCP protocols. Such a split could also be applied for the integrated access and backhaul case. Other differences anticipated in NR as compared to LTE with regards to IAB is the support of multiple hops as well as the support of redundant paths.

C. Overview of Different Architectures in IAB

Currently in 3GPP the architectures shown in FIGS. 3 and 4 for supporting user plane traffic over IAB node have been captured in 3GPP TS 38.874 (version 0.2.1).

The architecture 1a in FIG. 3 leverages CU/DU-split architecture. FIG. 3 shows the reference diagram for a two-hop chain of IAB-nodes underneath an IAB-donor. In this architecture, each IAB node holds a DU and an MT. Via the MT, the IAB-node connects to an upstream IAB-node or the IAB-donor. Via the DU, the IAB-node establishes RLC-channels to UEs and to MTs of downstream IAB-nodes. For MTs, this RLC-channel may refer to a modified RLC*. Whether an IAB node can connect to more than one upstream IAB-node or IAB-donor is FFS.

The donor also holds a DU to support UEs and MTs of downstream IAB-nodes. The IAB-donor holds a CU for the DUs of all IAB-nodes and for its own DU. It is FFS if different CUs can serve the DUs of the IAB-nodes. Each DU on an IAB-node connects to the CU in the IAB-donor using a modified form of F1, which is referred to as F1*. F1*-U runs over RLC channels on the wireless backhaul between the MT on the serving IAB-node and the DU on the donor. F1*-U transport between MT and DU on the serving IAB-node as well as between DU and CU on the donor is FFS. An adaptation layer is added, which holds routing information, enabling hop-by-hop forwarding. It replaces the IP functionality of the standard F1-stack. F1*-U may carry a GTP-U header for the end-to-end association between CU and DU. In a further enhancement, information carried inside the GTP-U header may be included into the adaption layer. Further, optimizations to RLC may be considered such as applying ARQ only on the end-to-end connection opposed to hop-by-hop. The right side of FIG. 3 shows two examples of such F1*-U protocol stacks. In this figure, enhancements of RLC are referred to as RLC*. The MT of each IAB-node further sustains NAS connectivity to the NGC, e.g., for authentication of the IAB-node. It further sustains a PDU-session via the NGC, e.g., to provide the IAB-node with connectivity to the OAM.

Details of F1*, the adaptation layer and RLC*remain to be studied. Details of hop-by-hop forwarding are FFS. Transport of F1-AP is FFS. Protocol translation between F1* and F1 in case the IAB-donor is split is FFS.

The architecture 1b shown in FIG. 4 also leverages CU/DU-split architecture. FIG. 4 shows the reference diagram for a two-hop chain of IAB-nodes underneath an IAB-donor. Note that the IAB-donor only holds one logical CU. Whether an IAB node can connect to more than one upstream IAB-node or IAB-donor is FFS. In this architecture, each IAB-node and the IAB-donor hold the same functions as in the architecture 1a. Also, as in the architecture 1a, every backhaul link establishes an RLC-channel, and an adaptation layer is inserted to enable hop-by-hop forwarding of F1*.

Opposed to the architecture 1a, the MT on each IAB-node establishes a PDU-session with a UPF residing on the donor. The MT's PDU-session carries F1* for the collocated DU. In this manner, the PDU-session provides a point-to-point link between CU and DU. On intermediate hops, the PDCP-PDUs of F1* are forwarded via adaptation layer in the same manner as described for the architecture 1a. The right side of FIG. 4 shows an example of the F1*-U protocol stack.

SUMMARY

Some embodiments provide a method by an integrated access backhaul (IAB) node in a radio network. The method includes generating a delivery status that indicates a status of a data connection, the data connection has a logical interface connection to a central unit (CU) node, the logical interface connection of the data connection is not terminated at the IAB node, and transmitting the delivery status to the CU node. The data connection may include a radio bearer, data flow, GTP tunnel, etc.

The method may further include receiving a downlink delivery status request message in response to transmitting the delivery status to the CU node.

The downlink delivery status request message may include a time value that specifies that the IAB node should send the delivery status every time a timer expires, until a certain number of reports are sent, or until an explicit downlink delivery status suspend message is received.

The logical interface connection may include an F1-U interface connection.

The delivery status may indicate a buffer status of a buffer associated with the data connection.

The delivery status may include a buffer size list including pairs of IAB node addresses and desired buffer sizes.

The buffer status may include a percent usage of the buffer.

The buffer status may include a cumulative indicator of all desired buffer size sizes (or percentages) of descendant IAB nodes of the IAB node as well as user equipment devices (UEs) directly connected to the IAB node.

A GTP-U header structure may indicate UE(s) or IAB nodes affected by congestion, and in the downlink delivery status request message, the CU may indicate a type of aggregation level required in the delivery status.

Some embodiments provide a method implemented in a communication system including a host computer, a cellular network, and a user equipment (UE). The method includes, at the host computer, providing user data, at the host computer, initiating a transmission carrying the user data to the UE via a cellular network including an integrated access backhaul (IAB) network, and at an IAB node of the IAB network, generating a delivery status that indicates a status of a data connection, the data connection has a logical interface connection to a central unit (CU) node, the logical interface connection of the data connection is not terminated at the IAB node, and transmitting the delivery status to the CU node.

Some embodiments provide a method, performed by a central unit (CU) node in an integrated access backhaul (IAB) radio network, for controlling traffic flow. The method includes receiving a delivery status from an IAB node, the delivery status indicating a problem, determining a severity of the problem indicated in the delivery status, and based on the determining, sending a downlink delivery status request message to one or more intermediate distributed unit nodes between the IAB node and the CU node.

The CU may send the downlink delivery status request message to determine a source of congestion if one or more of an indicated throughput request in the delivery status has degraded more than a first threshold amount from a previous request, or/and an indicated desired buffer size is zero, or is more than a second threshold amount lower than a desired buffer size indicated in a previous delivery status report.

The CU may transmit the downlink delivery status request message to the intermediate IAB nodes that are determined to be likely to be responsible for congestion, as determined from an affected traffic reported in an original delivery status.

The downlink delivery status request message may include a time value that specifies that a receiving node should send the delivery status every time this timer expires, until a certain number of reports are sent, or until an explicit downlink delivery status suspend message is received.

The delivery status may indicate a buffer status regarding bearers/traffic whose F1-U interface is not terminated at the IAB node.

The buffer status may include a buffer size that is structured in lists of pairs of IAB node addresses and their desired buffer sizes.

The buffer status may include a percent usage of a buffer allocated for each descendant IAB node.

The buffer status may include a cumulative indicator of all desired buffer size sizes or percentages of the descendant IAB nodes as well as UEs directly connected to the IAB node providing the delivery status.

A GTP-U header structure may indicate affected UE(s) or IAB nodes, and in the downlink delivery status request message, the CU indicates a type of aggregation level required in the delivery status (e.g., per bearer, per UE, per backhaul link, etc.).

Some embodiments provide a communication system including a host computer including processing circuitry and a communication interface configured to receive user data originating from a transmission from a user equipment (UE) to a base station via an integrated access backhaul (IAB) radio network, wherein the IAB network includes first and second nodes. The first node may include a communication interface and processing circuitry configured to perform operations of generating a delivery status that indicates a status of a data connection, wherein the data connection has a logical interface connection to a central unit (CU) node, and wherein the logical interface connection of the data connection is not terminated at the IAB node, and transmitting the delivery status to the CU node. The second node may include a communication interface and processing circuitry configured to perform operations of receiving a delivery status from an IAB node, the delivery status indicating a problem, determining a severity of the problem indicated in the delivery status, and based on the determining, sending a downlink delivery status request message to one or more intermediate distributed unit nodes between the IAB node and the CU node.

The processing circuitry of the host computer may be configured to execute a host application, and the UE may be configured to execute a client application associated with the host application, thereby providing the user data to be received by the host computer.

BRIEF DESCRIPTION OF THE DRAWINGS

FIG. 1 is a block diagram that illustrates a high-level view of the 5G network architecture, consisting of a Next Generation Radio Access Network (NG-RAN) and a 5G Core (5GC).

FIG. 2 is a block diagram that illustrates CP/UP separation in a gNB-CU/DU split architecture.

FIGS. 3 and 4 are block diagrams that illustrate IAB architectures.

FIGS. 5 and 6 are block diagrams that illustrates protocol stack examples for UE access in system with an IAB architecture in which embodiments may be implemented.

FIGS. 7A, 7B, 7C and 7D are block diagrams that illustrate example alternative architectures of systems including IAB nodes in which embodiments may be implemented.

FIG. 8 is a block diagram of a communication system including IAB nodes according to some embodiments.

FIGS. 9 and 10 are flowcharts illustrating operations according to various embodiments.

FIG. 11 is a block diagram of a wireless network in accordance with some embodiments.

DETAILED DESCRIPTION OF EMBODIMENTS

Figure 12:
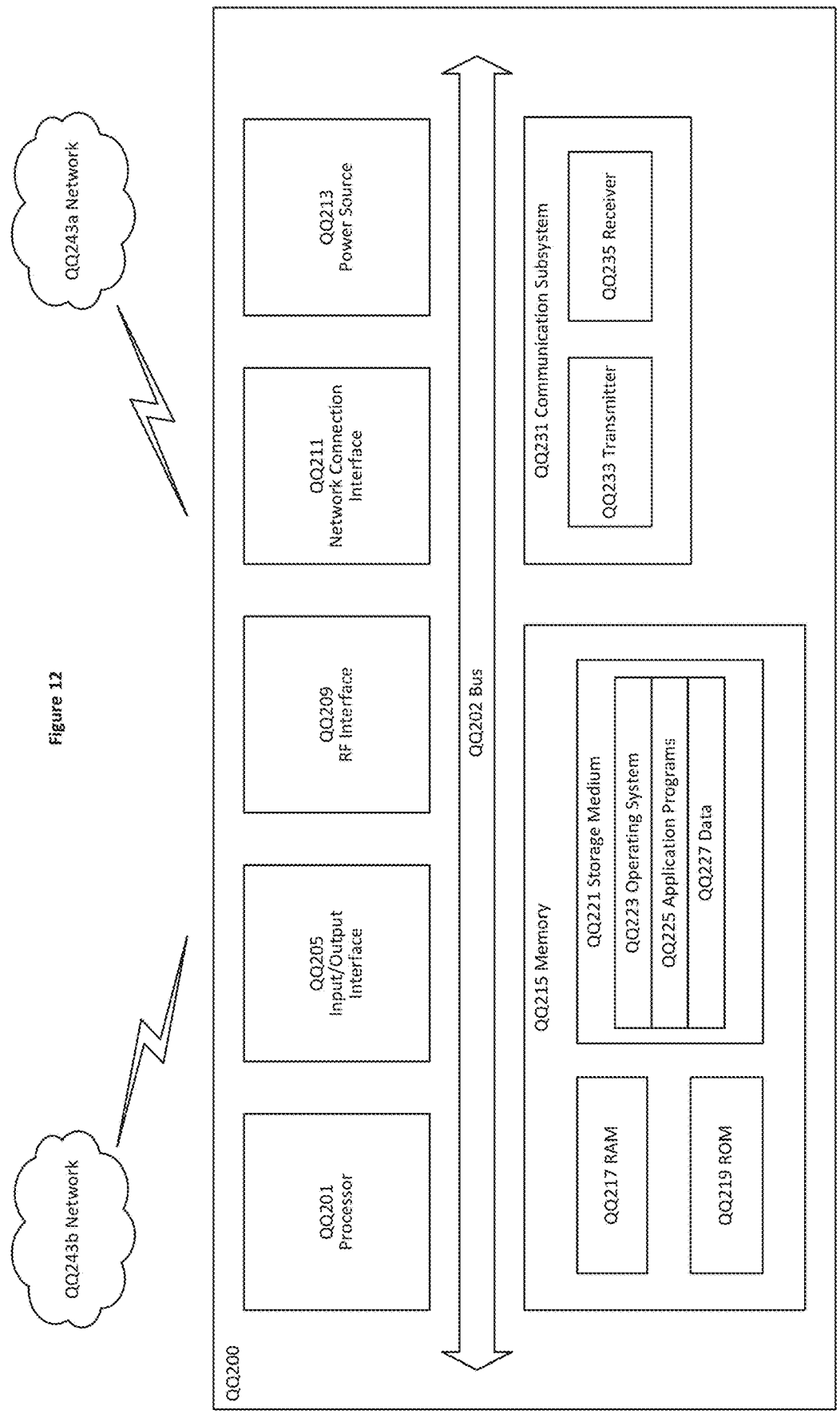
FIG. 12 is a block diagram of a user equipment in accordance with some embodiments.

Embodiments of the present inventive concepts now will be described more fully hereinafter with reference to the accompanying drawings, in which embodiments of the inventive concepts are shown. The inventive concepts may, however, be embodied in many different forms and should not be construed as limited to the embodiments set forth herein. Rather, these embodiments are provided so that this disclosure will be thorough and complete, and will fully convey the scope of the inventive concepts to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present inventive concepts. As used herein, the term "and/or" includes any and all combinations of one or more of the associated listed items.

The terminology used herein is for the purpose of describing particular embodiments only and is not intended to be limiting of the inventive concepts. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

User-Plane Considerations for Architecture

The following subsections describe various user plane aspects for architecture including placement of an adaptation layer, functions supported by the adaptation layer, support of multi-hop RLC, impacts on scheduler and QoS. The study will analyse the described architecture options to identify trade-offs between these various aspects with the goal to recommend a single architecture for this group. FIG. 5 illustrates protocol stack examples for UE-access using L2-relaying with adaptation layer, which can be used in the example architecture 1a. FIG. 6 illustrates protocol stack example for UE-access using L2-relaying with adaptation layer, which can be used in the example architecture 1b.

Adaptation Layer

The UE establishes RLC channels to the DU on the UE's access IAB node in compliance with TS 38.300. Each of these RLC-channels is extended via a potentially modified form of F1-U, referred to as F1*-U, between the UE's access DU and the IAB donor.

The information embedded in F1*-U is carried over RLC-channels across the backhaul links. Transport of F1*-U over the wireless backhaul is enabled by an adaptation layer, which is integrated with the RLC channel.

Within the IAB-donor (referred to as fronthaul), the baseline is to use native F1-U stack. The IAB-donor DU relays between F1-U on the fronthaul and F1*-U on the wireless backhaul.

Functions Supported by the Adaptation Layer

In the architecture 1a, information carried on the adaptation layer supports the following functions:
  Identification of the UE-bearer for the PDU,
  Routing across the wireless backhaul topology,
  QoS-enforcement by the scheduler on DL and UL on the wireless backhaul link,
  Mapping of UE user-plane PDUs to backhaul RLC channels,
  Others.

In the architecture 1b, information carried on the adaptation layer supports the following functions:
  Routing across the wireless backhaul topology,
  QoS-enforcement by the scheduler on DL and UL on the wireless backhaul link,
  Mapping of UE user-plane PDUs to backhaul RLC channels
  Others.

Content Carried on the Adaptation Layer Header

The study will identify all information to be carried on the adaptation layer header. This may include:
  UE-bearer-specific Id
  UE-specific Id
  Route Id, IAB-node or IAB-donor address
  QoS information
  Potentially other information IAB nodes will use the identifiers carried via Adapt to ensure required QoS treatment and to decide which hop a packet should be sent to. While details of the information carried in the adaptation layer are FFS, a brief overview is provided below on how the above information may be used to this end, if included in the final design of Adapt.

The UE-bearer-specific Id may be used by the IAB-node and the IAB-donor to identify the PDU's UE-bearer. UE's access IAB node would then map Adapt information (e.g. UE-specific ID, UE-bearer specific ID) into the corresponding C-RNTI and LCID. The IAB Donor DU may also need to map Adapt information into the F1-U GTP-U TEID used between Donor DU and Donor CU.

UE-bearer-specific Id, UE-specific Id, Route Id, or IAB-node/IAB-donor address may be used (in combination or individually) to route the PDU across the wireless backhaul topology.

UE-bearer-specific Id, UE-specific Id, UE's access node IAB ID, or QoS information may be used (in combination or individually) on each hop to identify the PDU's QoS treatment. The PDU's QoS treatment may also be based on the LCID.

Processing of adaptation layer information
  The study will identify, which of the information on the adaptation layer is processed to support the above functions on each on-path IAB-node (hop-by-hop),
  and/or on the UE's access-IAB-node and the IAB-donor (end-to-end).

Integration of Adaptation Layer into L2 Stack

The study will consider the following adaptation layer placements:
  integrated with MAC layer or placed above MAC layer, above RLC layer.

For 1:1 mapping of UE-bearers to backhaul RLC-channels, Adapt can be integrated with the MAC layer or placed above the MAC layer. A separate RLC-entity in each IAB node is provided for each of these backhaul RLC-channels. Arriving PDUs are mapped to the corresponding RLC-entity based on the UE-bearer information carried by Adapt.

When UE-bearers are aggregated to backhaul RLC-channels (e.g. based on QoS-profile), Adapt can be placed above the RLC layer.

For both Adapt above RLC and Adapt above MAC, when UE bearers are aggregated to logical channels, the logical channel can be associated to a QoS profile. The number of QoS-profiles supported is limited by the LCID-space.

The figures show example protocol stacks and do not preclude other possibilities. While RLC channels serving for backhauling include the adaptation layer, it is FSS if the adaptation layer is also included in IAB-node access links.

Adaptation Header Structure

The adaptation layer may consist of sublayers. It is perceivable, for example, that the GTP-U header becomes a part of the adaptation layer. It is also possible that the GTP-U header is carried on top of the adaptation layer to carry end-to-end association between the IAB-node DU and the CU.

Alternatively, an IP header may be part of the adaptation layer or carried on top of the adaptation layer. In this example, the IAB-donor DU holds an IP routing function to extend the IP-routing plane of the fronthaul to the IP-layer carried by adapt on the wireless backhaul. This allows native F1-U to be established end-to-end, i.e. between IAB-node DUs and IAB-donor CU-UP. The scenario implies that each IAB-node holds an IP-address, which is routable from the fronthaul via the IAB-donor DU. The IAB-nodes' IP addresses may further be used for routing on the wireless backhaul.

Note that the IP-layer on top of Adapt does not represent a PDU session. The MT's first hop router on this IP-layer therefore does not have to hold a UPF.

The design of the adaption header is FFS.

Observations on Adaptation Layer Placement

1. The above-RLC adaptation layer can only support hop-by-hop ARQ. The above-MAC adaptation layer can support both hop-by-hop and end-to-end ARQ.

2. Both adaptation layer placements can support aggregated routing, e.g. by inserting an IAB-node address into the adaptation header.

3. FFS whether UE-specific ID, if it is used, will be a completely new identifier or whether one of the existing identifiers can be reused, as well as whether the identifier(s) included in Adapt vary depending on the adaptation layer placement.

4. Both adaptation layer placements can support per-UE-bearer QoS treatment. In order for each UE bearer to receive individual QoS support when their number exceeds the size of the LCID space, one possible solution is the extension of the LCID-space which can be achieved through changes to the MAC sub-header, or by dedicated information placed in the Adapt header. FFS whether 8 groups for the uplink BSR reporting is sufficient or whether the scheduling node has to possess better knowledge of which DRB has uplink data.

5. Both adaptation layer placements can support aggregated QoS handling as in the following example network configurations:
  a. For above-RLC adaptation layer, UE-bearers with same QoS profile could be aggregated to one backhaul RLC-channel for this purpose.
  b. For above-MAC or integrated-with-MAC adaptation layer, UE-bearers with same QoS profile could be treated with same priority by the scheduler.

6. For both adaptation layer placements, aggregation of routing and QoS handling allows proactive configuration of intermediate on-path IAB-nodes, i.e. configuration is independent of UE-bearer establishment/release.

7. For both adaptation layer placements, RLC ARQ can be pre-processed on TX side.

Multi-Hop RLC ARQ

For RLC AM, ARQ can be conducted hop-by-hop along access and backhaul links (FIG. 5 c,d,e and FIG. 6). It is also possible to support ARQ end-to-end between UE and IAB-donor (FIG. 5a, b). Since RLC segmentation is a just-in-time process it is always conducted in a hop-by-hop manner. FIGS. 5 and 6 show example protocol stacks and do not preclude other possibilities.

The type of multi-hop RLC ARQ and adaptation-layer placement have the following interdependence:

End-to-end ARQ: Adaptation layer is integrated with MAC layer or placed above MAC layer
Hop-by-hop ARQ: No interdependence
Observations for end-to-end and hop-by-hop ARQ

TABLE 1:

hop by hop vs. end to end RLC ARQ

| Metric | Hop-by-hop RLC ARQ | End-to-end RLC ARQ |
| --- | --- | --- |
| Forwarding latency | Potentially higher as packets have to pass through RLC-state machine on each hop. | Potentially lower as packets do not go through the RLC state machine on intermediate IAB-nodes. |
| Latency due to retransmission | Independent of number of hops | Increases with number of hops |
| Capacity | Packet loss requires retransmission only on one link. Avoids redundant retransmission of packets over links where the packet has already been successfully transmitted. | Packet loss may imply retransmission on multiple links, including those where the packet was already successfully transmitted. |
| Hop count limitation due to RLC parameters | Hop count is not affected by max window size. | Hop count may be limited by the end-to-end RLC latency due to max window size. |
| Hop count limitation due to PCDP parameters | Hop count may be limited by increasing disorder of PDCP PDUs over sequential RLC ARQ hops. This may increase probability to exceed max PDCP window size. | Hop count does not impact disorder of PDCP PDUs due to RLC ARQ. |
| Processing and memory impact on intermediate IAB-nodes | Larger since processing and memory is required on intermediate IAB-nodes. | Smaller since intermediate path-nodes do not need ARQ state machine and flow window. |
| RLC specification impact | No stage-3 impact expected | Potential stage-3 impact |
| Operational impact for IAB-node to IAB-donor upgrades | IAB-nodes and IAB-donors use the same hop-by-hop RLC ARQ. As a result, this functionality is completely unaffected by the upgrade of IAB-node to IAB-donor at availability of fiber, potentially reducing the effort required to confirm proper operation. | End-to-end RLC ARQ results in a greater architectural difference between IAB nodes vs. IAB donor nodes. As a result, additional effort may be required to complete an upgrade of an IAB node to an IAB donor upon availability of fiber. |
| Configuration complexity | RLC timers are not dependent on hop-count. | RLC timers become hop-count dependent. |

Control-Plane Considerations for Architecture Group 1

In architecture 1a, the UE's and the MT's UP and RRC traffic can be protected via PDCP over the wireless backhaul. A mechanism has to be defined to also protect F1-AP traffic over the wireless backhaul. The following alternatives can be considered. Other alternatives are not precluded.

Alternative 1:

FIG. 7A shows protocol stacks for UE's RRC, MT's RRC and DU's F1-AP for alternative 1. In these examples, the adaptation layer is placed on top of RLC. On the IAB-node's access link, the adaptation layer may or may not be included. The example does not preclude other options. This alternative has the following main features:

The UE's and the MT's RRC are carried over SRB.
On the UE's or MT's access link, the SRB uses an RLC-channel.
On the wireless backhaul links, the SRB's PDCP layer is carried over RLC-channels with adaptation layer. The adaptation layer placement in the RLC channel is the same for C-plane as for U-plane. The information carried on the adaptation layer may be different for SRB than for DRB.
The DU's F1-AP is encapsulated in RRC of the collocated MT. F1-AP is therefore protected by the PDCP of the underlying SRB.
Within the IAB-donor, the baseline is to use native F1-C stack.

Alternative 2:

FIG. 7B shows protocol stacks for UE's RRC, MT's RRC and DU's F1-AP for alternative 2. In these examples, the adaptation layer resides on top of RLC. On the IAB-node's access link, the adaptation layer may or may not be included. The example does not preclude other options. This alternative has the following main features:

The UE's and the MT's RRC are carried over SRB.
On the UE's or MT's access link, the SRB uses an RLC-channel.
On the wireless backhaul link, the PDCP of the RRC's SRB is encapsulated into F1-AP.
The DU's F1-AP is carried over an SRB of the collocated MT. F1-AP is protected by this SRB's PDCP.
On the wireless backhaul links, the PDCP of the F1-AP's SRB is carried over RLC-channels with adaptation layer. The adaptation layer placement in the RLC channel is the same for C-plane as for U-plane. The information carried on the adaptation layer may be different for SRB than for DRB.

Within the IAB-donor, the baseline is to use native F1-C stack.

Alternative 3:

FIG. 7C shows protocol stacks for UE's RRC, MT's RRC and DU's F1-AP for alternative 3. In these examples, the adaptation layer resides on top of RLC. On the IAB-node's access link, the adaptation layer may or may not be included. The example does not preclude other options. This alternative has the following main features:

The UE's and the MT's RRC are carried over SRB.

On the UE's or MT's access link, the RRC's SRB uses an RLC-channel. On the wireless backhaul links, the SRB's PDCP layer is carried over RLC-channels with adaptation layer. The adaptation layer placement in the RLC channel is the same for C-plane as for U-plane. The information carried on the adaptation layer may be different for SRB than for DRB.

The DU's F1-AP is also carried over an SRB of the collocated MT. F1-AP is protected by this SRB's PDCP.

On the wireless backhaul links, the PDCP of the SRB is also carried over RLC-channels with adaptation layer.

Within the IAB-donor, the baseline is to use native F1-C stack.

Alternative 4:

FIG. 7D shows protocol stacks for UE's RRC, MT's RRC and DU's F1-AP for alternative 4. In these examples, the adaptation layer resides on top of RLC and carries an IP-layer. This alternative has the following main features:

The IP-layer carried by adapt is connected to the fronthaul's IP-plane through a routing function at the IAB-donor DU. On this IP-layer, all IAB-nodes hold IP-addresses, which are routable from the IAB-donor CU-CP.

The extended IP-plane allows native F1-C to be used between IAB-node DU and IAB-donor CU-DP. Signalling traffic can be prioritized on this IP routing plane using DSCP markings in compliance with TS 38.474.

F1-C is protected via NDS, e.g. via D-TLS, as established by S3-181838.

The UE's and the MT's RRC use SRB, which is carried over F1-C in compliance with TS 38.470.

F1-U Protocol

F1-U protocol (also referred to as NR User Plane Protocol) is used to convey control information related to the user data flow management of data radio bearers (TS 38.425; NR User Plane Protocol). The F1-U protocol data is conveyed by GTP-U protocol, specifically, by means of the "RAN Container" GTP-U extension header defined in (TS 29.281; GPRS Tunnel Protocol User Plane.

The GTP-U protocol over UDP over IP serves as the TNL for data streams on the F1 interface. The transport bearer is identified by the GTP-U tunnel endpoint ID (TEID) and the IP address (source TEID, destination TEID, source IP address, destination IP address). The F1-U protocol uses the services of the TNL in order to allow flow control of user data packets transferred from the node hosting NR PDCP (CU-UP in the case of CU-DU split) to the corresponding node (DU).

The services provided by the F1-U are (TS 38.425):

Provision of NR user plane specific sequence number information for user data transferred from the node hosting NR PDCP to the corresponding node for a specific data radio bearer.

Information of successful in sequence delivery of NR PDCP PDUs to the UE from the corresponding node for user data associated with a specific data radio bearer.

Information of NR PDCP PDUs that were not delivered to the UE or the lower layers.

Information of NR PDCP PDUs transmitted to the lower layers for user data associated with a specific data radio bearer.

Information of downlink NR PDCP PDUs to be discarded for user data associated with a specific data radio bearer;

Information of the currently desired buffer size at the corresponding node for transmitting to the UE user data associated with a specific data radio bearer.

Information of the currently minimum desired buffer size at the corresponding node for transmitting to the UE user data associated with all data radio bearers configured for the UE at the corresponding node;

Information of successful in sequence delivery of NR PDCP PDUs to the UE from the corresponding node for retransmission user data associated with a specific data radio bearer;

Information of NR PDCP PDUs transmitted to the lower layers for retransmission user data associated with a specific data radio bearer;

Information of the specific events at the corresponding node (e.g. radio link outage, radio link resume).

The purpose of the Downlink Data Delivery Status procedure is to provide feedback from the corresponding node to the node hosting the NR PDCP entity to allow the node hosting the NR PDCP entity to control the downlink user data flow via the corresponding node for the respective data radio bearer. The corresponding node may also transfer uplink user data for the concerned data radio bearer to the node hosting the NR PDCP entity together with a DL DATA DELIVERY STATUS frame within the same GTP-U PDU.

The Downlink Data Delivery Status procedure (DDDS) is also used to provide feedback from the corresponding node to the node hosting the NR PDCP entity to allow the node hosting the NR PDCP entity to control the successful delivery of DL control data to the corresponding node.

When the corresponding node decides to trigger the Feedback for Downlink Data Delivery (DDD procedure it shall report:

a) in case of RLC AM, the highest NR PDCP PDU sequence number successfully delivered in sequence to the UE among those NR PDCP PDUs received from the node hosting the NR PDCP entity i.e. excludes those retransmission NR PDCP PDUs;

b) the desired buffer size in bytes for the concerned data radio bearer;

c) optionally, the desired data rate in bytes associated with a specific data radio bearer configured for the UE;

d) the NR-U packets that were declared as being "lost" by the corresponding node and have not yet been reported to the node hosting the NR PDCP entity within the DL DATA DELIVERY STATUS frame;

e) if retransmission NR PDCP PDUs have been delivered, the highest NR PDCP PDU sequence number successfully delivered in sequence to the UE among those retransmission NR PDCP PDUs received from the node hosting the NR PDCP entity;

f) if retransmission NR PDCP PDUs have been transmitted, the highest NR PDCP PDU sequence number transmitted to the lower layers among those retransmission NR PDCP PDUs received from the node hosting the NR PDCP entity;

g) the highest NR PDCP PDU sequence number transmitted to the lower layers among those NR PDCP PDUs received from the node hosting the NR PDCP entity i.e. excludes those retransmission NR PDCP PDUs.

If a deployment has decided not to use the Transfer of Downlink User Data procedure, d), e) and f) above are not applicable.

As soon as the corresponding node detects the successful RACH access by the UE for the corresponding data bearer(s), the corresponding node shall send initial DL DATA DELIVERY STATUS frame to the node(s) hosting the NR PDCP entity(ies). The node hosting NR PDCP entity may start sending DL data before receiving the initial DL DATA DELIVERY STATUS frame. In case the DL DATA DELIVERY STATUS frame is sent before any NR PDCP PDU is transferred to lower layers, the information on the highest NR PDCP PDU sequence number successfully delivered in sequence to the UE and the highest NR PDCP PDU sequence number transmitted to the lower layers may not be provided.

The DL DATA DELIVERY STATUS frame shall also include a final frame indication signalling whether the frame is the last DL status report received in the course of releasing a bearer from the corresponding node. Namely, the final frame indication is signalled in cases where the corresponding node knows that the bearer will be released before the DL status report is signalled. When receiving such indication, if applicable, the node hosting the NR PDCP entity considers that no more UL or DL data is expected to be transmitted between the corresponding node and the UE.

The DL DATA DELIVERY STATUS frame may also include an indication of detected radio link outage or radio link resume. When receiving an indication of UL or DL radio link outage detection, the node hosting the NR PDCP entity considers that traffic delivery over DRBs configured for the UE is unavailable at the corresponding node for UL or DL, depending on the indicated outage. When receiving an indication of UL or DL radio link resume detection, the node hosting the NR PDCP entity considers that traffic delivery over DRBs configured for the UE is available at the corresponding node in UL or in DL, depending on the indicated resume.

The node hosting the NR PDCP entity, when receiving the DL DATA DELIVERY STATUS frame:

- regards the desired buffer size under b) and the data rate under c) above as the amount of data to be sent from the hosting node:
- If the value of the desired buffer size is 0, the hosting node shall stop sending any data per bearer.
- If the value of the desired buffer size in b) above is greater than 0, the hosting node may send up to this amount of data per bearer beyond the "Highest Delivered NR PDCP SN" for RLC AM, or the hosting node may send up to this amount of data per bearer beyond the "Highest Transmitted NR PDCP SN" for RLM UM.
- The value of the desired data rate in c) above is the amount of data desired to be received in a specific amount of time. The amount of time is 1 sec.
- The information of the buffer size in b) above and of the data rate in c) above is valid until the next DL DATA DELIVERY STATUS frame is transferred.
- is allowed to remove the buffered NR PDCP PDUs according to the feedback of transmitted and/or successfully delivered NR PDCP PDUs;
- decides upon the actions necessary to take for NR PDCP PDUs reported other than transmitted and/or successfully delivered.

In case of RLC AM, after the highest NR PDCP PDU sequence number successfully delivered in sequence is reported to the node hosting the NR PDCP entity, the corresponding node removes the respective NR PDCP PDUs. For RLC UM, the corresponding node may remove the respective NR PDCP PDUs after transmitting to lower layers.

Basically, F1-U provides the flow control mechanism so that the node where the PDCP is terminated (CU or CU-UP in the case where there is a CU-CP/CU-UP split) will not keep overloading the DU by sending it too much data if data was not being delivered fast enough over the UE-DU air interface (e.g. due to bad radio conditions).

The important consequence of not using GTP-U for F1-U is the lack of flow control mechanism for user data packets. In the IAB UP architecture alternatives that do not employ full F1-U protocol stack (e.g. FIG. 5 a,b, and c), the CU-UP is only aware of how much traffic goes through the first wireless backhaul hop (through the flow control of the F1-U between the CU-UP and donor DU), while it is completely unaware of the status of the UP data flow on subsequent wireless backhaul links. If the first wireless backhaul link (between donor DU and IAB node 1) is in a good condition, regardless of the radio/buffering conditions on subsequent links/nodes, the CU-UP will keep feeding the donor DU with traffic. In the two hop IAB system depicted in FIG. 5, if the link between IAB node 1 and IAB node 2 experiences poor channel conditions, this may lead to buffer overflow on IAB1, causing data loss.

As discussed above, the adaptation layer for IAB can be either below or above RLC, and RLC ARQ can be performed hop by hop or end to end (i.e. between the donor DU and the IAB node). Performing the RLC ARQ hop by hop have several advantages as compared to end to end ARQ, as captured in Table 1.

As also as discussed above, using F1-U end to end between the IAB node and the IAB donor provides a flow control mechanism that can be used to control congestion in the network. However, there are two short comings of the end to end flow control mechanism as currently specified:

1. F1-U flow control (and the associated downlink delivery status report that is used to facilitate that) sends information to the CU concerning only about the bearers for the UEs that are being served by the DU sending the report. For example, consider the scenario in FIG. 8. IAB node 2 is serving two UEs, and that IAB node has also three descendent IAB nodes (#3, 4 and 5). The delivery status that the IAB node 2 is sending to the CU is only concerning about the traffic of the two UEs and also some traffic (e.g. OAM) that is being sent to the MT part of the 3 descendant IAB nodes. This is because the data that is intended for the UEs of the descendant IAB nodes (also the descendants of these IAB nodes) is simply passed on, via the adaptation layer, further on, and thus will not be reflected in the delivery status report. The problem with this is that, congestion may be caused at this IAB node by the traffic that are not accounted for in the downlink delivery status (e.g. UE3_1 to UE3_a, or/and UE5_1 to UE5_b, or/and UE6_1 to UE6_c, etc). The CU, on seeing that the throughput has decreased or there are some packet drops from the downlink delivery status, may throttle the traffic of the two UEs (UE 2_1 and UE 2_2) (i.e. stop pushing them towards the donor DU). This may not solve the problem because they were not the cause of the congestion to begin with.

2. Another issue with the E2E flow control scheme is that there may be no way of exactly pinpointing where exactly the problem is occurring in a multi-hop setting. The problem could have been in any of the intermediate nodes, but what the CU will see is that the throughput for those bearers has dropped and will throttle them. For example, a delivery status report from IAB6 indicating loss of throughput may not be useful to identify if the problem is in the hop between IAB1 and IAB2, or IAB2 and IAB4 or IAB4 and IAB6 and/or which UEs/bearers are the cause of the problem.

Various embodiments are described herein which address one or more of these issues. Mechanisms to enhance the end to end flow control in a multi-hop IAB network are provided. Specifically, methods are provided to enable the CU to detect and determine congestion in intermediate nodes or links affecting the data transmission in an IAB node. The methods are based on following:

1. The CU collecting delivery status reports from each IAB node.
 a. The delivery status reports can be triggered by the CU sending a request for delivery status report. This in turn may be triggered by CU receiving a delivery status report from an IAB indicating that there is problem or congestion (which may be due to intermediate nodes being congested).
 b. The downlink delivery status can be enhanced to also include information about the buffer status concerning those bearers/traffic whose F1-U is not terminated at the IAB node.
2. The enhancement of the delivery status reports to include aggregated information of multiple bearers of a given UE or multiple bearers of several/all UEs that are sharing a backhaul link.
3. Methods for the CU to compile the delivery status report from each IAB node to determine the source of the congestion problem.
4. Methods in the CU to take action to mitigate a problem with congested nodes, such as slowing down or blocking traffic to the affected node, and possibly letting other traffic through that is not related to the congested node or link.

Some embodiments described herein introduce mechanisms for the CU to detect and solve congestion in intermediate nodes or links without necessarily having the need to introduce a hop by hop flow control (i.e. relying only on enhance end to end flow control) which would have added to system complexity. With the knowledge of the congestion in the intermediate nodes, the CU can take actions to ensure good performance including slowing down traffic to the congested node or link while maintaining high data rates for non-congested links of the network.

Some of the embodiments will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

The focus of the description below is on the IAB scenario. However, most of the methods are applicable in any kind of multi-hop system where flow control functionality is available/desired between network nodes. Moreover, while the description below relatese to radio bearers, it will be appreciated that the inventive concepts apply to data connections carried by IAB nodes, including data flows, GTP tunnels, etc. Accordingly, as used herein, the term "data connection" encompasses radio bearers, data flows, connections, tunnels, etc., that are carried by/through an IAB node.

In the discussion below, FIG. 9 focuses on the controlling of the traffic flow (i.e. starting or stopping the traffic flow or reducing or increasing the transmission rate of a particular bearer, UE or several UEs sharing a particular IAB node or backhaul node due to end to end flow control). However, other actions could be triggered due to the reception of a flow control message instead of or in addition to the controlling of the traffic (e.g. initiating a handover or path switch of a UE or an IAB node from one path/node to another path/node).

In one embodiment, the CU may compile delivery status reports from the IAB nodes that it is serving to determine the source/location of congestion. If the CU must wait to receive all of the delivery statuses, then the process may be too slow and packet drop due to buffer overflow may occur. To speed up the compilation process and detect the problem in time, a method is provided whereby when the CU receives, from an IAB node, a delivery status indicating a problem (step 902). The CU determines the severity of the problem (step 904). Depending on the severity of the problem, the CU sends (step 906) a downlink delivery status request message to all or some of the intermediate DUs between the IAB node that transmitted the report and the CU (i.e., IAB nodes and donor DU).

For example, the CU can decide to initiate this delivery status requesting from the intermediate nodes if the indicated throughput request in the delivery status has degraded considerably from previous request (e.g. current request is x % lower than the throughput request in the previous delivery status or a certain threshold); or/and the indicated desired buffer size is zero (i.e. indication for the CU to stop sending data), or if it is considerably lower than the desired buffer size indicated in the previous delivery status report (e.g. current desired buffer is y % lower than the throughput request).

The decision to initiate downlink delivery status request to a particular intermediate IAB node may depend on the original downlink delivery status that triggered the request and the topology of the IAB network. For example, the CU may request the delivery status of only the intermediate IAB nodes that are likely to be responsible for the congestion, as can be seen from the affected traffic reported in the original delivery status.

The downlink delivery status request can be interpreted as a one-time request, or some additional parameters can be associated with it. For example, a time value that specifies that the receiving node should send the delivery status every time this timer expires, until a certain number of reports are sent (which is also a configurable parameter sent along with the delivery status request or configured earlier during the IAB node setup or reconfiguration procedures), or until an explicit downlink delivery status suspend message. Note that the suspend message here will not affect normal delivery status triggering (i.e. the DU will keep sending the delivery status when it detects packet loss, or some other mechanism depending on implementation).

It should be noted that if the delivery status includes a radio outage indication, then the situation is different as compared to a delivery status that is indicating desired buffer size drop or throughput degradation, because in this case, the CU can correctly diagnose that the problem is with the access link towards the UEs/IAB nodes that the IAB node sending the status report is serving, and thus throttling the transmission of the traffic of those UEs/IAB nodes served by the concerned IAB node will help in preventing buffer overflow and packet loss.

In another embodiment, methods are provided to enhance the downlink delivery status report to also include information about the buffer status concerning those bearers/traffic whose F1-U is not terminated at the IAB node. For example, for the scenario depicted in FIG. 8, when IAB2 is sending a delivery status to the CU, it can include the information about the buffer status (or desired buffer size) concerning traffic that is destined for IAB nodes 3, 4, 5 and 6 (and subsequently for their UEs or their descendant IAB nodes and the UEs of these IAB nodes, and so on). This report can be structured in a list of pairs of IAB node addresses and desired buffer sizes (e.g. IAB node 3, desired buffer size3; IAB node 4, desired buffer size 4; etc.). In addition to or instead of the desired buffer size, percent usage of the buffer allocated for the sake of each descendant IAB node may be included in the report. Another possibility is to not have a separate list but the desired buffer size (or percent usage) will be a cumulative of all the desired buffer size sizes (or percentages) of the descendant IAB nodes as well as the UEs directly connected to the IAB node sending the report.

The delivery status report from an IAB node can be enhanced to include aggregated information rather than the information of one particular bearer. This aggregation could be performed for multiple bearers of a given UE or multiple bearers of several/all UEs that are sharing a backhaul link or an IAB node. In order to do this, the GTP-U header structure could be enhanced to indicate the affected UE(s) or IAB nodes. In the delivery status request, the CU can indicate the type of aggregation level required (per bearer, per UE, per all UEs sharing a backhaul link, etc.)

In the above, the case is described where the delivery status was triggered due to a request from the CU. It is also possible for the delivery status reports to be triggered by messages/information received from other neighboring IAB nodes or other network nodes/elements such as those from the OAM system.

Example operations according to some embodiments are illustrated in FIG. 10. As shown therein, a method of providing delivery status reports includes generating, at an IAB node, a delivery status that indicates a status of a data connection, such as a radio bearer, data flow, tunnel, or other connection that has a logical interface connection to a CU that is not terminated at the IAB node (step 1002) and transmitting the delivery status to the CU (block 1004).

The method may further include receiving a downlink delivery status request message in response to transmitting the delivery status to the CU node.

The downlink delivery status request message may include a time value that specifies that the IAB node should send the delivery status every time a timer expires, until a certain number of reports are sent, or until an explicit downlink delivery status suspend message is received.

The logical interface connection may include an F1-U interface connection.

The delivery status may indicate a buffer status of a buffer associated with the radio bearer.

The delivery status may include a buffer size list including pairs of IAB node addresses and desired buffer sizes.

The buffer status may include a percent usage of the buffer.

The buffer status may include a cumulative indicator of all desired buffer size sizes (or percentages) of descendant IAB nodes of the IAB node as well as user equipment devices (UEs) directly connected to the IAB node.

A GTP-U header structure may indicate UE(s) or IAB nodes affected by congestion, and in the downlink delivery status request message, the CU may indicate a type of aggregation level required in the delivery status.

Exemplary Embodiments

1. A method, performed by a central unit (CU) node in an first integrated access backhaul (IAB) radio network, for controlling traffic flow, the method comprising:

receiving a delivery status from an IAB node, the delivery status indicating a problem;

determining a severity of the problem indicated in the delivery status; and based on the determining, sending a downlink delivery status request message to one or more intermediate distributed unit nodes between the IAB node and the CU node.

2. The method of embodiment 1, wherein the CU sends the downlink delivery status request message to determine a source of congestion if one or more of:

an indicated throughput request in the delivery status has degraded more than a threshold amount from previous request (e.g. current request is x % lower than the throughput request in the previous delivery status or a certain threshold); or/and an indicated desired buffer size is zero (i.e. indication for the CU to stop sending data), or if it is more than a threshold amount lower than a desired buffer size indicated in the previous delivery status report (e.g. current desired buffer is y % lower than the throughput request).

3. The method of any of embodiments 1-2, wherein the CU the downlink delivery status request message to the intermediate IAB nodes that are determined to be likely to be responsible for the congestion, as determined from an affected traffic reported in an original delivery status.

4. The method of any of embodiments 1-3, wherein the downlink delivery status request message includes a time value that specifies that a receiving node should send the delivery status every time this timer expires, until a certain number of reports are sent (which is also a configurable parameter sent along with the delivery status request or configured earlier during the IAB node setup or reconfiguration procedures), or until an explicit downlink delivery status suspend message is received.

5. The method of any of embodiments 1-4, wherein the delivery status indicates a buffer status regarding bearers/traffic whose F1-U is not terminated at the IAB node.

6. The method of embodiment 5, wherein the buffer status includes a buffer size that is structured in lists of pairs of IAB node addresses and their desired buffer sizes.

7. The method of embodiment 5, wherein the buffer status includes a percent usage of a buffer allocated for the sake of each descendant IAB node.

8. The method of embodiment 5, wherein the buffer status includes a cumulative indicator of all the desired buffer size sizes (or percentages) of the descendant IAB nodes as well as the UEs directly connected to the IAB node providing the delivery status.

9. The method of any of embodiments 1-8, wherein a GTP-U header structure indicates the affected UE(s) or IAB nodes, and wherein in the downlink delivery status request message, the CU indicates the type of aggregation level required (per bearer, per UE, and/or per all UEs sharing a backhaul link).

10. A method, performed by an integrated access backhaul (IAB) node in a radio network, the method comprising:

providing a delivery status to a central unit (CU) node, the delivery status indicating a problem; and responsive to the CU determining a severity of the problem indicated in the delivery status, receiving a downlink delivery status request message.

11. The method of embodiment 10, wherein the downlink delivery status request message includes a time value that specifies that the IAB node should send the delivery status every time this timer expires, until a certain number of reports are sent (which is also a configurable parameter sent along with the delivery status request or configured earlier during the IAB node setup or reconfiguration procedures), or until an explicit downlink delivery status suspend message is received.

12. The method of any of embodiments 10-11, wherein the delivery status indicates a buffer status regarding bearers/traffic whose F1-U is not terminated at the IAB node.

13. The method of embodiment 12, wherein the buffer status includes a buffer size that is structured in lists of pairs of IAB node addresses and their desired buffer sizes.

14. The method of embodiment 12, wherein the buffer status includes a percent usage of a buffer allocated for the sake of each descendant IAB node.

15. The method of embodiment 12, wherein the buffer status includes a cumulative indicator of all the desired buffer size sizes (or percentages) of the descendant IAB nodes as well as the UEs directly connected to the IAB node providing the delivery status.

16. The method of any of embodiments 10-15, wherein a GTP-U header structure indicates UE(s) or IAB nodes affected by confestion, and wherein in the downlink delivery status request message, the CU indicates the type of aggregation level required (per bearer, per UE, and/or per all UEs sharing a backhaul link).

17. A method implemented in a communication system including a host computer, a cellular network, and a user equipment (UE), the method comprising:
 at the host computer, providing user data;
 at the host computer, initiating a transmission carrying the user data to the UE via a cellular network comprising an integrated access backhaul (IAB) network; and
 operations, performed by a node of the IAB network, corresponding to any of the methods of embodiments 1-16.

18. A communication system including a host computer comprising a communication interface configured to receive user data originating from a transmission from a user equipment (UE) to a base station via an integrated access backhaul (IAB) radio network, wherein:
 the IAB network comprises first and second nodes;
 the first node comprises a communication interface and processing circuitry configured to perform operations corresponding to any of the methods of embodiments 1-9; and
 the second node comprises a communication interface and processing circuitry configured to perform operations corresponding to any of the methods of embodiments 10-16.

19. The communication system of embodiment 18, further including the UE, wherein the UE is configured to communicate with the IAB node.

20. The communication system of any of embodiments 18-19, wherein:
 the processing circuitry of the host computer is configured to execute a host application;
 the UE is configured to execute a client application associated with the host application, thereby providing the user data to be received by the host computer.

Further Description Regarding Exemplary Embodiments

Although the subject matter described herein may be implemented in any appropriate type of system using any suitable components, the embodiments disclosed herein are described in relation to a wireless network, such as the example wireless network illustrated in FIG. 11. For simplicity, the wireless network of FIG. 11 only depicts network QQ106, network nodes QQ160 and QQ160*b*, and WDs QQ110, QQ110*b*, and QQ110*c*. In practice, a wireless network may further include any additional elements suitable to support communication between wireless devices or between a wireless device and another communication device, such as a landline telephone, a service provider, or any other network node or end device. Of the illustrated components, network node QQ160 and wireless device (WD) QQ110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node QQ160 and WD QQ110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 11, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. 11 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174. In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units In certain embodiments, some or all of the functionality described herein as being provided by a network node, base station, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner. In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190. In some embodiments, processing circuitry QQ170 and device readable medium QQ180 may be considered to be integrated.

Interface QQ190 is used in the wired or wireless communication of signalling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ190 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used.

Alternative embodiments of network node QQ160 may include additional components beyond those shown in FIG. 11 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, WiFi, WiMAX, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ114 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner. In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry QQ120. In some embodiments, processing circuitry QQ120 and device readable medium QQ130 may be considered to be integrated.

User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

FIG. 12 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE QQ200 may be any UE identified by the 3rd Generation Partnership Project (3GPP), including a NB-IoT UE, a machine type communication (MTC) UE, and/or an enhanced MTC (eMTC) UE. UE QQ200, as illustrated in FIG. 12, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 12 is a UE, the components discussed herein are equally applicable to a WD, and vice-versa.

In FIG. 12, UE QQ200 includes processing circuitry QQ201 that is operatively coupled to input/output interface QQ205, radio frequency (RF) interface QQ209, network connection interface QQ211, memory QQ215 including random access memory (RAM) QQ217, read-only memory (ROM) QQ219, and storage medium QQ221 or the like, communication subsystem QQ231, power source QQ233, and/or any other component, or any combination thereof. Storage medium QQ221 includes operating system QQ223, application program QQ225, and data QQ227. In other embodiments, storage medium QQ221 may include other similar types of information. Certain UEs may utilize all of the components shown in FIG. 12, or only a subset of the components. The level of integration between the components may vary from one UE to another UE. Further, certain UEs may contain multiple instances of a component, such as multiple processors, memories, transceivers, transmitters, receivers, etc.

In FIG. 12, processing circuitry QQ201 may be configured to process computer instructions and data. Processing circuitry QQ201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry QQ201 may include two central processing units (CPUs). Data may be information in a form suitable for use by a computer.

In the depicted embodiment, input/output interface QQ205 may be configured to provide a communication interface to an input device, output device, or input and output device. UE QQ200 may be configured to use an output device via input/output interface QQ205. An output device may use the same type of interface port as an input device. For example, a USB port may be used to provide input to and output from UE QQ200. The output device may be a speaker, a sound card, a video card, a display, a monitor, a printer, an actuator, an emitter, a smartcard, another output device, or any combination thereof. UE QQ200 may be configured to use an input device via input/output interface QQ205 to allow a user to capture information into UE QQ200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 12, RF interface QQ209 may be configured to provide a communication interface to RF components such as a transmitter, a receiver, and an antenna. Network connection interface QQ211 may be configured to provide a communication interface to network QQ243a. Network QQ243a may encompass wired and/or wireless networks such as a local-area network (LAN), a wide-area network (WAN), a computer network, a wireless network, a telecommunications network, another like network or any combination thereof. For example, network QQ243a may comprise a Wi-Fi network. Network connection interface QQ211 may be configured to include a receiver and a transmitter interface used to communicate with one or more other devices over a communication network according to one or more communication protocols, such as Ethernet, TCP/IP, SONET, ATM, or the like. Network connection interface QQ211 may implement receiver and transmitter functionality appropriate to the communication network links (e.g., optical, electrical, and the like). The transmitter and receiver functions may share circuit components, software or firmware, or alternatively may be implemented separately.

RAM QQ217 may be configured to interface via bus QQ202 to processing circuitry QQ201 to provide storage or caching of data or computer instructions during the execution of software programs such as the operating system, application programs, and device drivers. ROM QQ219 may be configured to provide computer instructions or data to processing circuitry QQ201. For example, ROM QQ219 may be configured to store invariant low-level system code or data for basic system functions such as basic input and output (I/O), startup, or reception of keystrokes from a keyboard that are stored in a non-volatile memory. Storage medium QQ221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium QQ221 may be configured to include operating system QQ223, application program QQ225 such as a web browser application, a widget or gadget engine or another application, and data file QQ227. Storage medium QQ221 may store, for use by UE QQ200, any of a variety of various operating systems or combinations of operating systems.

Storage medium QQ221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium QQ221 may allow UE QQ200 to access computer-executable instructions, application programs or the like, stored on transitory or non-transitory memory media, to off-load data, or to upload data. An article of manufacture, such as one utilizing a communication system may be tangibly embodied in storage medium QQ221, which may comprise a device readable medium.

In FIG. 12, processing circuitry QQ201 may be configured to communicate with network QQ243b using communication subsystem QQ231. Network QQ243a and network QQ243b may be the same network or networks or different network or networks. Communication subsystem QQ231 may be configured to include one or more transceivers used to communicate with network QQ243b. For example, communication subsystem QQ231 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter QQ233 and/or receiver QQ235 to implement transmitter or receiver functionality, respectively, appropriate to the RAN links (e.g., frequency allocations and the like). Further, transmitter QQ233 and receiver QQ235 of each transceiver may share circuit components, software or firmware, or alternatively may be implemented separately.

In the illustrated embodiment, the communication functions of communication subsystem QQ231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem QQ231 may include cellular communication, Wi-Fi communication, Bluetooth communication, and GPS communication. Network QQ243b may encompass wired and/or wireless networks such as a local-area network (LAN), a wide-area network (WAN), a computer network, a wireless network, a telecommunications network, another like network or any combination thereof. For example, network QQ243b may be a cellular network, a Wi-Fi network, and/or a near-field network. Power source QQ213 may be configured to provide alternating current (AC) or direct current (DC) power to components of UE QQ200.

The features, benefits and/or functions described herein may be implemented in one of the components of UE QQ200 or partitioned across multiple components of UE QQ200. Further, the features, benefits, and/or functions described herein may be implemented in any combination of hardware, software or firmware. In one example, communication subsystem QQ231 may be configured to include any of the components described herein. Further, processing circuitry QQ201 may be configured to communicate with any of such components over bus QQ202. In another example, any of such components may be represented by program instructions stored in memory that when executed by processing circuitry QQ201 perform the corresponding functions described herein. In another example, the functionality of any of such components may be partitioned between processing circuitry QQ201 and communication subsystem QQ231. In another example, the non-computationally intensive functions of any of such components may be implemented in software or firmware and the computationally intensive functions may be implemented in hardware.

Abbreviations

At least some of the following abbreviations can be used in this disclosure. If there is an inconsistency between abbreviations, preference should be given to how it is used above. If listed multiple times below, the first listing should be preferred over any subsequent listing(s).

1×RTT CDMA2000 1× Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
CSI-RS CSI Reference Signal
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
ABS Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Packet Data Protocol
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management RS Reference Signal
RSCP Received Signal Code Power
RSRP Reference Symbol (or Signal) Received Power
RSRQ Reference Symbol (or Signal) Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSB Synchronization Signal Block
SSS Secondary Synchronization Signal
TDD Time Division Duplex
TDOA Time Difference of Arrival
TOA Time of Arrival
TSS Tertiary Synchronization Signal
TTI Transmission Time Interval
TTT Time-to-Trigger
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network
CM Cubic Metric
MIMO Multiple-input-multiple-output
MRC Maximum-ratio combining
MRT Maximum-ratio transmission
OCC Orthogonal Cover Code
PAPR Peak to Average Power Ratio
SRS Sounding Reference Signal
SPS Semi-Persistent Scheduling
URLLC Ultra-Reliable Low Latency Communication
VL-MIMO Very-large multiple-input-multiple-output
ZF Zero Forcing Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed typical embodiments of the inventive concepts and, although specific terms are employed, they are used in a generic and descriptive sense only and not for purposes of limitation, the scope of the inventive concepts being set forth in the following claims.

What is claimed is:

1. A method, performed by an integrated access backhaul (IAB) node in a radio network, the method comprising:
    generating a delivery status that indicates a status of a data connection carried by the IAB node,
    wherein the data connection has a logical interface connection to a central unit (CU) node, and
    wherein the logical interface connection of the data connection is not terminated at the IAB node; and
    transmitting the delivery status to the CU node in response to a downlink delivery status request message from the CU node,
    wherein the downlink delivery status request message includes a time value that specifies that the IAB node should send the delivery status every time a timer expires until a certain number of delivery statuses are sent;
    wherein the delivery status comprises a buffer size list including pairs of IAB node addresses and buffer statuses of buffers.

2. The method of claim 1, wherein the data connection comprises a radio bearer.

3. The method of claim 1, wherein the logical interface connection comprises an F1-U interface connection.

4. The method of claim 1, wherein the delivery status indicates a buffer status of a buffer associated with the data connection.

5. The method of claim 4, wherein the buffer status includes a percent usage of the buffer.

6. The method of claim 4, wherein the buffer status includes a cumulative indicator of all desired buffer sizes or percentages of descendant IAB nodes of the IAB node as well as user equipment devices (UEs) directly connected to the IAB node.

7. The method of claim 1, wherein a GTP-U header structure indicates UE(s) or IAB nodes affected by congestion, and wherein in the downlink delivery status request message, the CU indicates a type of aggregation level required in the delivery status.

8. The method of claim 1, wherein the logical interface connection of the data connection is terminated at a downstream IAB node that is served by the IAB node.

9. A method, performed by a central unit (CU) node in an integrated access backhaul (IAB) radio network, for controlling traffic flow, the method comprising:
    receiving a delivery status from an IAB node, the delivery status indicating a problem;
    determining a severity of the problem indicated in the delivery status; and
    based on the determining, sending a downlink delivery status request message to one or more intermediate distributed unit nodes between the IAB node and the CU node,
    wherein the downlink delivery status request message includes a time value that specifies that a receiving node should send the delivery status every time a timer expires until a certain number of delivery statuses are sent;
    wherein the delivery status comprises a buffer size list including pairs of IAB node addresses and buffer statuses of buffers.

10. The method of claim 9, wherein the CU sends the downlink delivery status request message to determine a source of congestion if one or more of:
    an indicated throughput request in the delivery status has degraded more than a first threshold amount from a previous request; and
    an indicated desired buffer size is zero, or is more than a second threshold amount lower than a desired buffer size indicated in a previous delivery status.

11. The method of claim 9, wherein the CU transmits the downlink delivery status request message to the intermediate IAB nodes that are determined to be likely to be responsible for congestion, as determined from an affected traffic reported in an original delivery status.

12. The method of claim 9, wherein the delivery status indicates a buffer status regarding bearers or traffic whose F1-U interface is not terminated at the IAB node.

13. The method of claim 12, wherein the buffer status includes a cumulative indicator of all desired buffer sizes or percentages of the descendant IAB nodes of the IAB node as well as UEs directly connected to the IAB node providing the delivery status.

14. The method of claim 9, wherein a GTP-U header structure indicates affected UE(s) or IAB nodes, and wherein in the downlink delivery status request message, the CU indicates a type of aggregation level required in the delivery status.

15. A communication system including a host computer comprising processing circuitry and a communication interface coupled to the processing circuitry and configured to receive user data originating from a transmission from a user equipment (UE) to a base station via an integrated access backhaul (IAB) radio network, wherein:

the IAB network comprises first and second nodes; the first node comprises a communication interface and processing circuitry configured to perform operations corresponding to claim 1; and the second node comprises a communication interface and processing circuitry configured to perform operations corresponding to a method, performed by a central unit (CU) node in an integrated access backhaul (IAB) radio network, for controlling traffic flow, the method comprising:

receiving a delivery status from an IAB node, the delivery status indicating a problem;

determining a severity of the problem indicated in the delivery status; and based on the determining, sending a downlink delivery status request message to one or more intermediate distributed unit nodes between the IAB node and the CU node.

* * * * *